United States Patent [19]
Miu et al.

[11] Patent Number: 5,821,596
[45] Date of Patent: Oct. 13, 1998

[54] BATCH FABRICATED SEMICONDUCTOR MICRO-SWITCH

[75] Inventors: Denny K. Miu, Valencia; James R. W. Clymer, Mountain View, both of Calif.; Paul A. Endter, Chandler, Ariz.; Viktoria A. Temesvary, Culver City, Calif.; Tseng-Yang Hsu, Passadena, Calif.; Weilong Tang, Alhambra, Calif.

[73] Assignee: Integrated Micromachines, Inc., Burbank, Calif.

[21] Appl. No.: 822,839

[22] Filed: Mar. 24, 1997

[51] Int. Cl.⁶ .............................. H01L 29/82; H01L 43/00
[52] U.S. Cl. .................... 257/419; 257/421; 257/423; 257/426; 257/427
[58] Field of Search .................................. 257/390, 421, 257/423, 426, 427, 419; 438/275, 391, 292, 466

[56] References Cited

U.S. PATENT DOCUMENTS 5,643,816   7/1997   Hsu et al. .............................. 257/390

*Primary Examiner*—Carl W. Whitehead, Jr.
*Attorney, Agent, or Firm*—Skjerven, Morrill, MacPherson, Franklin & Friel LLP; Norman R. Klivans

[57] ABSTRACT

A micro-switch having a flexible conductive membrane which is moved by an external force, such as pressure from an air flow, to establish a connection between contact pads. The conductive membrane is stretched over one or more spacer pads to introduce deformation in the conductive membrane, thereby improving the accuracy and repeatability of the micro-switch. The spacing between the contact pads and the conductive membrane is precisely controlled by controlling the height difference between the spacer pads and the conductive pads. This height difference is determined by one or more precisely controlled etch operations.

25 Claims, 18 Drawing Sheets

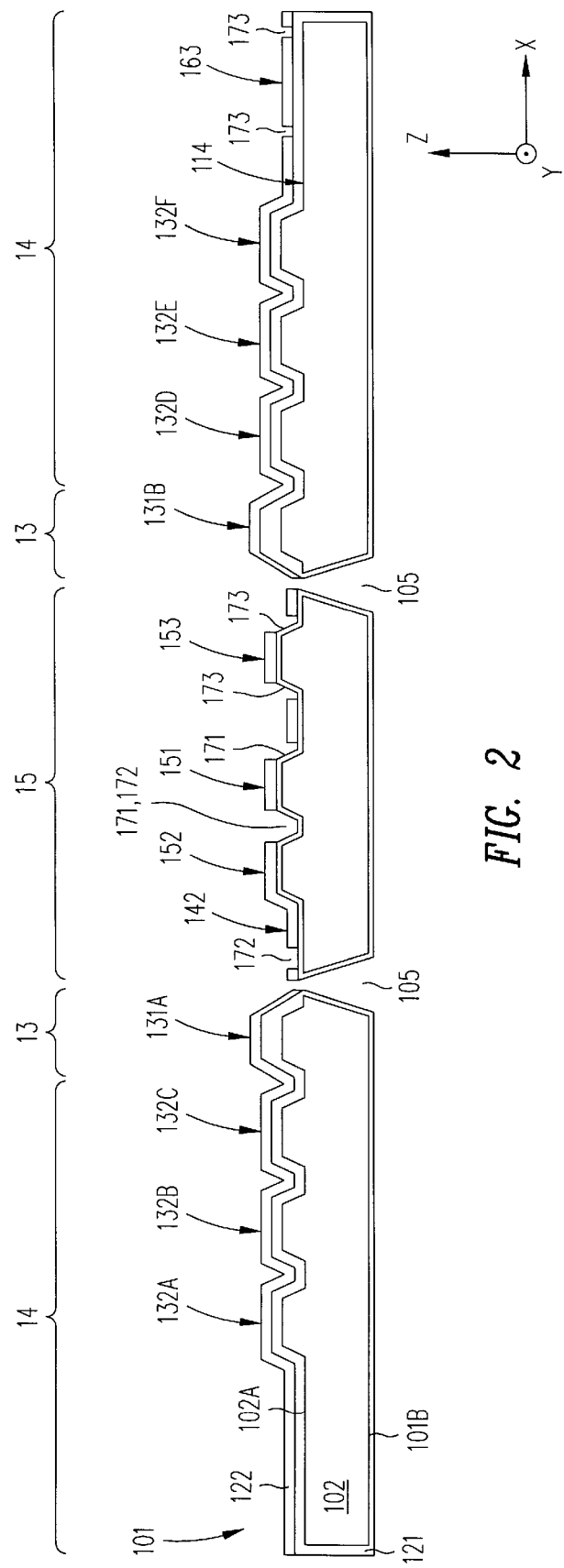
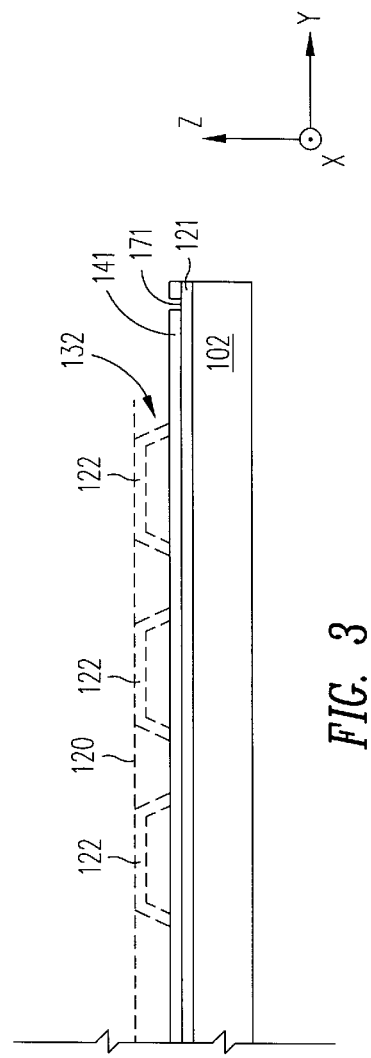
FIG. 2
FIG. 3

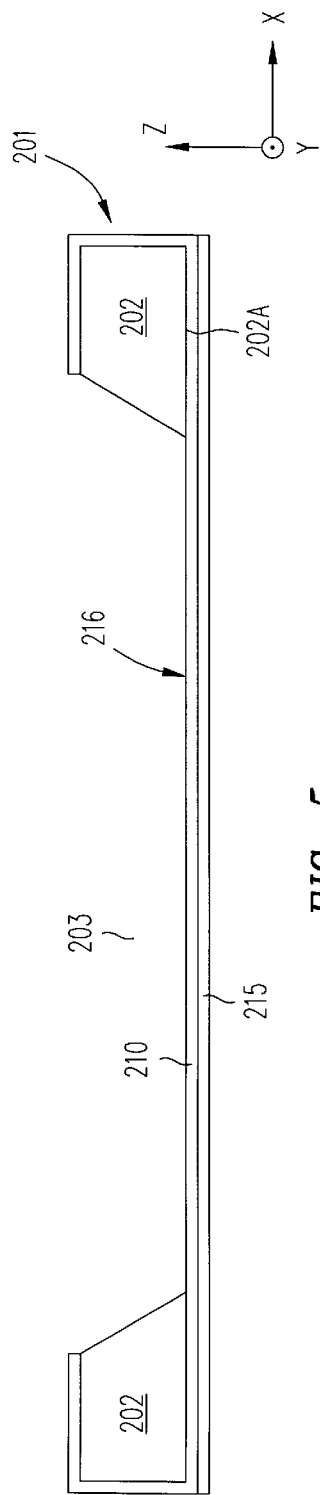
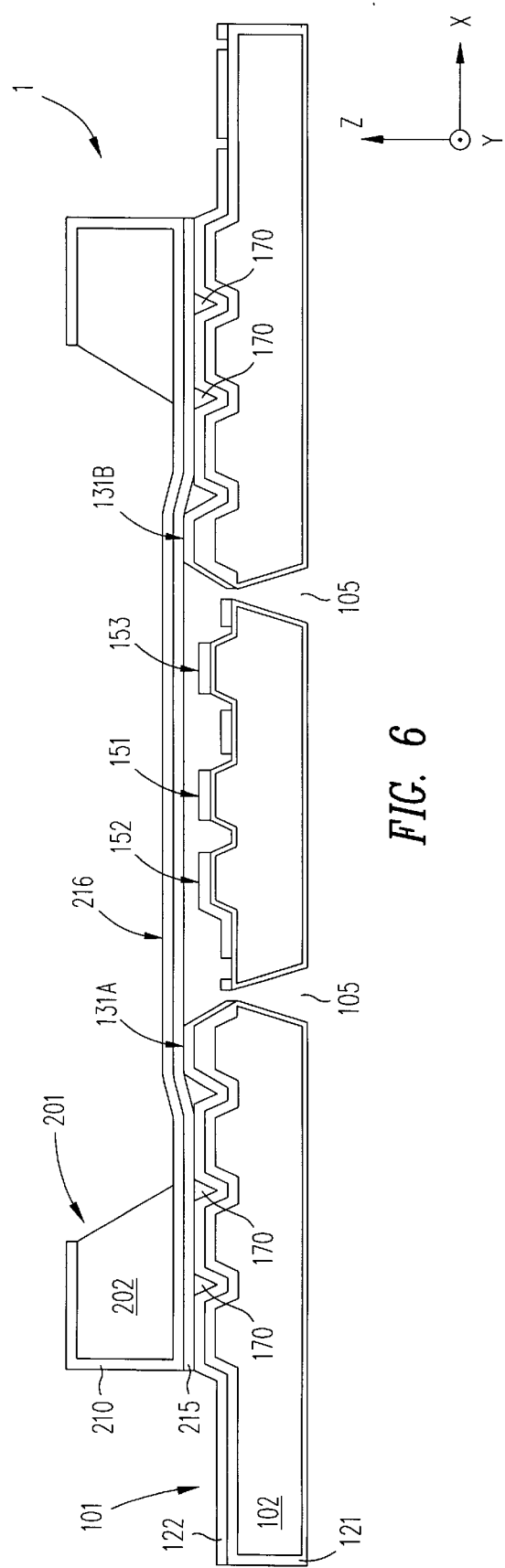

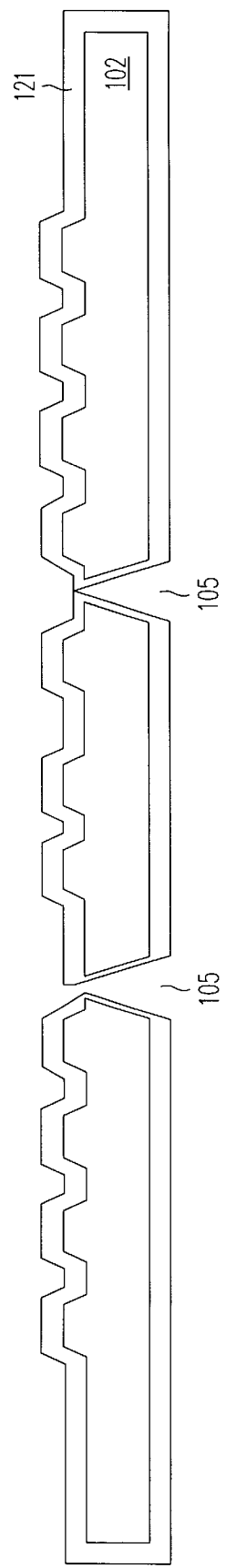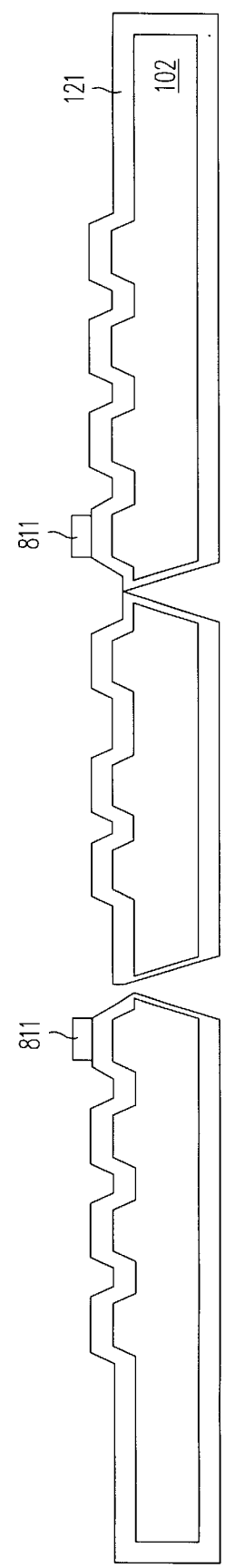

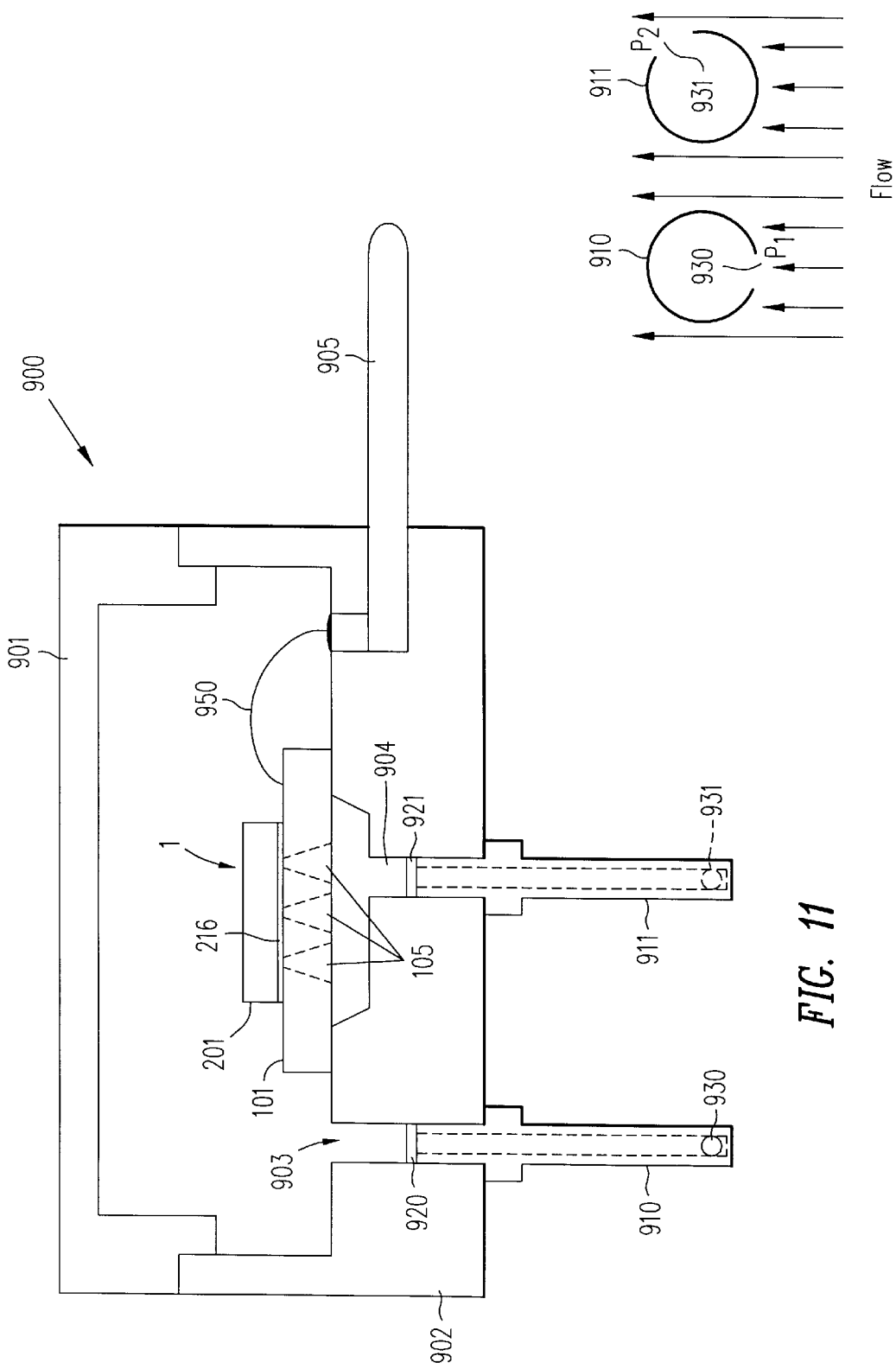
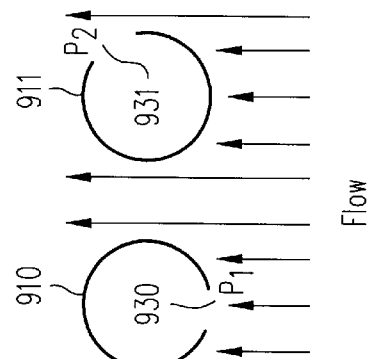
FIG. 11
FIG. 12

BATCH FABRICATED SEMICONDUCTOR MICRO-SWITCH

FIELD OF USE

The present invention relates to a micro-switch which undergoes physical movement in response to an applied external force. This invention also relates to techniques for fabricating such a micro-switch.

BACKGROUND ART

In many electronic systems which contain a large amount of working electronics (e.g., in a personal computer), the cooling of the electronic components in the system is very important. This cooling is typically provided by a electrically powered fan, which introduces an air flow over the electronic components. Loss of cooling can lead directly to the overheating and failure of one or more of the electronic components. The failure of these electronic components can, in turn, result in a total system failure. The system manufacturers typically bear the cost of repairing the failed system. In addition, the manufacturers will typically experience a negative impact on the reputation of their system products.

Often, a sensor is provided to detect the working temperature of the electronic components. The temperature sensor is typically located inside of a system enclosure or on a critical electronic component. However, because the temperature sensor only detects a cooling system failure after the temperature has risen, the electronic components may be damaged by the time the temperature sensor reports the cooling system failure.

Tachometer sensors have also been provided to measure the rotation of the fan. In addition, current sensors have been provided to measure the electrical current being drawn by the fan motor. However, it is possible that cooling is not adequately being provided even if the fan is turning at the right speed and drawing the appropriate amount of current. This may occur, for example, if the air outlets (or inlets) of the system enclosure are blocked.

It would therefore be desirable to have a low cost, reliable sensor that accurately measures the actual air flow in the system to be protected. It would also be desirable to have an improved sensor for reliably detecting the ambient temperature in the system to be protected.

SUMMARY

Accordingly, the present invention provides a very sensitive micro-switch which can be used to detect the actual air flow provided by a fan. Such a micro-switch includes a flexible conductive membrane which is moved by an external force, such as pressure from an air flow, to establish a connection between contact pads. The conductive membrane is stretched over one or more spacer pads which introduce deformation in the conductive membrane. The spacing between the contact pads and the conductive membrane is precisely controlled by controlling the height difference between the spacer pads and the contact pads, thereby improving the accuracy and repeatability of the micro-switch.

In accordance with a particular embodiment of the invention, such a micro-switch includes a first structural member which is joined with a second structural member. The first structural member includes one or more spacer pads. The second structural member includes a conductive membrane, which can be formed, for example, by a vacuum deposited silicon nitride film having a thin conductive layer formed thereon. The second structural member is joined with the first structural member such that the conductive membrane is forced into contact with the spacer pads, thereby causing the membrane to deform over the spacer pads. In one alternative, the spacer pads are arranged to define a closed pattern, and one or more contact pads are located on the first structural member within this closed pattern. The spacer pads have a height which is greater than the height of the contact pads. Because the membrane is deformed over the spacer pads, the membrane is substantially co-planar with the upper surfaces of the spacer pads, and a gap exists between the conductive membrane and the contact pads. The gap between the membrane and the contact pads (i.e., the micro-switch gap) is equal to the difference in height between the spacer pads and the contact pads. Because the spacer pads and the contact pads are both formed on the first structural member, the difference in height between the spacer pads and contact pads can be precisely controlled using different process steps. As a result, after assembly, the gap between the conductive membrane of the second structural member and the contact pads of the first structural member can be precisely controlled.

When an external force, such as pressure due to an air flow, is applied to the conductive membrane, the conductive membrane deforms into contact with one or more of the contact pads, thereby forming a closed circuit. The presence or absence of a closed circuit can therefore be used to determine the presence or absence of a specific amount of external air flow.

Alternatively, the capacitance which exists between the conductive membrane and the contact pads can be measured to determine the proximity of the conductive membrane to the contact pads (during the time that the conductive membrane and the contact pads are not in contact with one another).

In another embodiment, the contact pads have a height which is greater or equal to the height of the spacer pads. In this embodiment, the conductive membrane normally contacts the contact pads, thereby resulting in a normally closed micro-switch.

In accordance with one alternative, one or more holes extend through the first structural member to expose the conductive membrane through the first structural member. In a variation of this alternative, one or more channels are located on the upper surface of the first structural member to expose the conductive membrane to an external environment.

In different applications (i.e., applications other than air flow measurements), a micro-switch in accordance with the present invention can be used to detect pressure/vacuum, temperature, or the presence of magnetic fields or chemicals.

The present invention further includes a method of making a micro-switch which includes the steps of: (1) forming a plurality of support pads on a first structural member, the support pads having a first height, (2) forming a plurality of spacer pads on the first structural member, the spacer pads having a second height which is greater than the first height, and (3) affixing a second structural member to the support pads of the first structural member, wherein the second structural member includes a membrane which is stretched over the spacer pads. This method can further include the step of (4) forming one or more contact pads on the first structural member, the contact pads having a third height, wherein the contact pads are located within a pattern defined by the spacer pads. The third height can be greater than the first height to form a normally closed micro-switch. Alternatively, the third height can be less than the first height to form a normally open micro-switch.

The steps of forming the support pads, the spacer pads and the contact pads can include the steps of forming an insulating layer, and selectively etching the insulating layer at locations corresponding to the support pads and the contact pads, but not the spacer pads. This method can further include the step of selectively etching the insulating layer at locations corresponding to the contact pads, but not the support pads or the spacer pads.

The present invention will be more fully understood in light of the following detailed description taken together with the drawings.

BRIEF DESCRIPTION OF THE DRAWINGS

FIG. 2 is a cross sectional view of the lower structural member of FIG. 1 along section line 2—2 of FIG. 1;

FIG. 3 is a cross-sectional view along section line 3—3 of FIG. 1.

FIG. 5 is a cross sectional view of the upper structural member of FIG. 4 along section line 5—5 of FIG. 4;

FIG. 6 is a cross sectional view illustrating a micro-switch which is formed by connecting the lower structural member of FIG. 1 and the upper structural member of FIG. 4;

FIGS. 8A–8H are cross sectional views illustrating the lower structural member of FIG. 1 during selected processing steps;

FIG. 11 is a cross sectional view of a micro-switch assembly in accordance with one embodiment of the invention;

FIG. 12 is a top view of the air flow tubes of the micro-switch assembly of FIG. 11;

DETAILED DESCRIPTION

Figure 1:
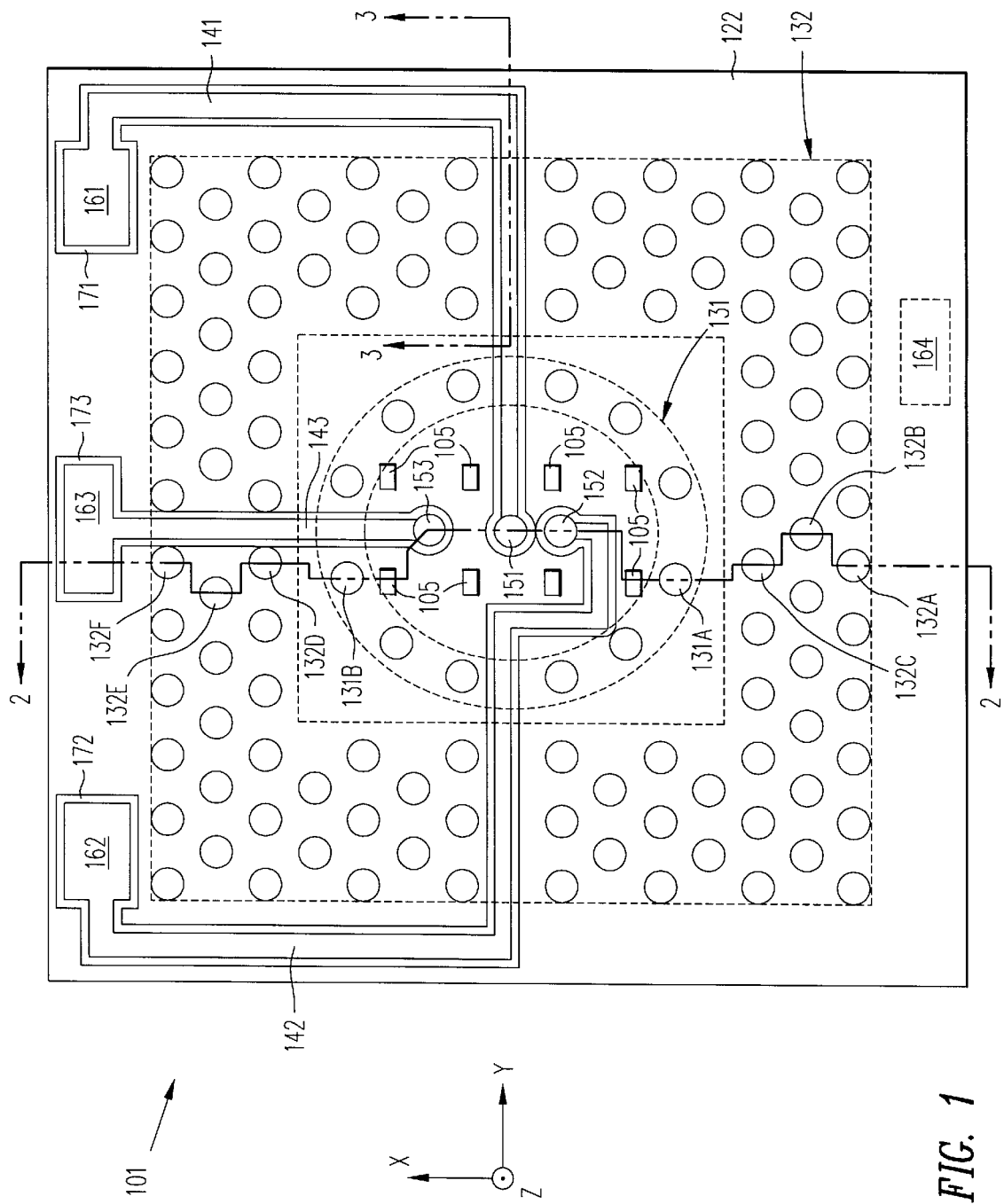
FIG. 1 is a top view of a lower structural member of a micro-switch in accordance with one embodiment of the present invention.

FIG. 1 is a top view of a lower structural member 101 of a micro-switch 1 in accordance with one embodiment of the present invention. As described in more detail below, the lower structural member 101 is joined to an upper structural member 201 (FIGS. 4, 5) to form the micro-switch 1 (FIG. 6). FIG. 2 is a cross sectional view of the lower structural member 101 along section line 2—2 of FIG. 1. FIGS. 1 and 2 use the illustrated X-Y-Z coordinate system. Lower structural member 101 includes a substrate 102, a plurality of holes 105 which extend through the substrate 102, a circular pattern of spacer pads 131 (including spacer pads 131A and 131B), a pattern of support pads 132 (including support pads 132A–132F), contact pads 151–153, conductive traces 141–143, and bond pads 161–163.

In the described embodiment, substrate 102 is a monocrystalline silicon wafer having a <100> crystalline structure. In this embodiment, substrate 102 has a thickness along the Z-axis in the range of 400 to 700 $\mu$m. In other embodiments, other structural materials can be used to form substrate 102.

An array of trapezoidal holes 105 are formed through substrate 102 at a centrally located region of substrate 102. In the described embodiment, there are eight holes 105, each of the holes 105 having an area of approximately 100×100 $\mu$m at the upper surface 102A of the substrate 102. The holes 105 are provided to vent to the atmospheric pressure or another air chamber through substrate 102.

A patterned cavity 114 is formed in the upper surface 102A of the substrate 102. In the described embodiment, the depth of cavity 114 is approximately 5 $\mu$m along the Z-axis. The cavity 114 defines the locations of the spacer pads 131, the support pads 132, and the contact pads 151–153. The functionality of cavity 114 will become apparent in view of the subsequent disclosure.

A patterned insulating layer 121 is located over the upper surface 102A of the substrate 102. The patterned insulating layer 121 has a varying thickness along the upper surface 102A of the substrate 102. The insulating layer 121 has a relatively large thickness at region 13 (i.e., where spacer pads 131 are formed), an intermediate thickness at region 14 (i.e., where support pads 132 are formed), and a relatively small thickness at region 15 (i.e., where contact pads 151–153 are formed). Thus, region 13 of the insulating layer 121 forms a layer of the multi-layer spacer pads 131. Region 14 of the insulating layer 121 forms a layer of the multi-layer support pads 132. Region 15 of the insulating layer 121 forms a layer of the multi-layer contact pads 151–153.

A patterned metal layer 122, having a uniform thickness of approximately 3,000 Å, is located over the upper surfaces of the insulating layer 121. The patterned metal layer 122 forms the uppermost layers of the multi-layer spacer pads 131, support pads 132 and contact pads 151–153. The patterned metal layer 122 also forms conductive traces 141–143, as well as bond pads 161–164. Conductive traces 141–143 extend from centrally located contact pads 151–153, respectively, to peripherally located bond pads 161–163, respectively. Traces 141, 142 and 143 are routed between the spacer pads 131 and the support pads 132. Contact pad 151, trace 141 and bond pad 161 are defined by a trench 171 etched in the metal layer 122. Similarly, contact pad 152, trace 142 and bond pad 162 are defined by a trench 172 etched in the metal layer 122. Finally, contact pad 153, trace 143 and bond pad 163 are defined by a trench 173 etched in the metal layer 122.

In the embodiment illustrated, the spacer pads 131 are arranged in a circular pattern which surrounds the contact pads 151–153 and the holes 105. The spacer pads 131 can be arranged in a round shape (as illustrated), or in various other shapes, including, but not limited to, a rectangular shape. Spacer pads 131 can be replaced with a single continuous spacer pad which extends along the circular pattern defined by spacer pads 131.

The pattern of support pads 132 laterally surrounds the pattern of spacer pads 131. Because the patterned insulating layer 121 has a greater thickness in the structure of the spacer pads 131 than in the structure of the support pads 132 or the contact pads 151–153, the spacer pads 131 have a greater height along the Z-axis than the support pads 132 or the contact pads 151–153.

FIG. 3 is a cross-sectional view of trace 141 along section line 3—3 of FIG. 1. As illustrated in FIG. 3, trace 141 is located at a lower position along the Z-axis than the portions of the metal layer 122 which form the upper surfaces of the support pads 132. As described in more detail below, dashed line 120 indicates the location of a conductive membrane of the upper structural member 201 after the micro-switch 1 has been assembled. Because dashed line 120 is located above the conductive trace 141, the conductive trace 141 is electrically isolated from this conductive membrane. Traces 142 and 143 are located in between support pads 132 in the same manner as trace 141.

Figure 4:
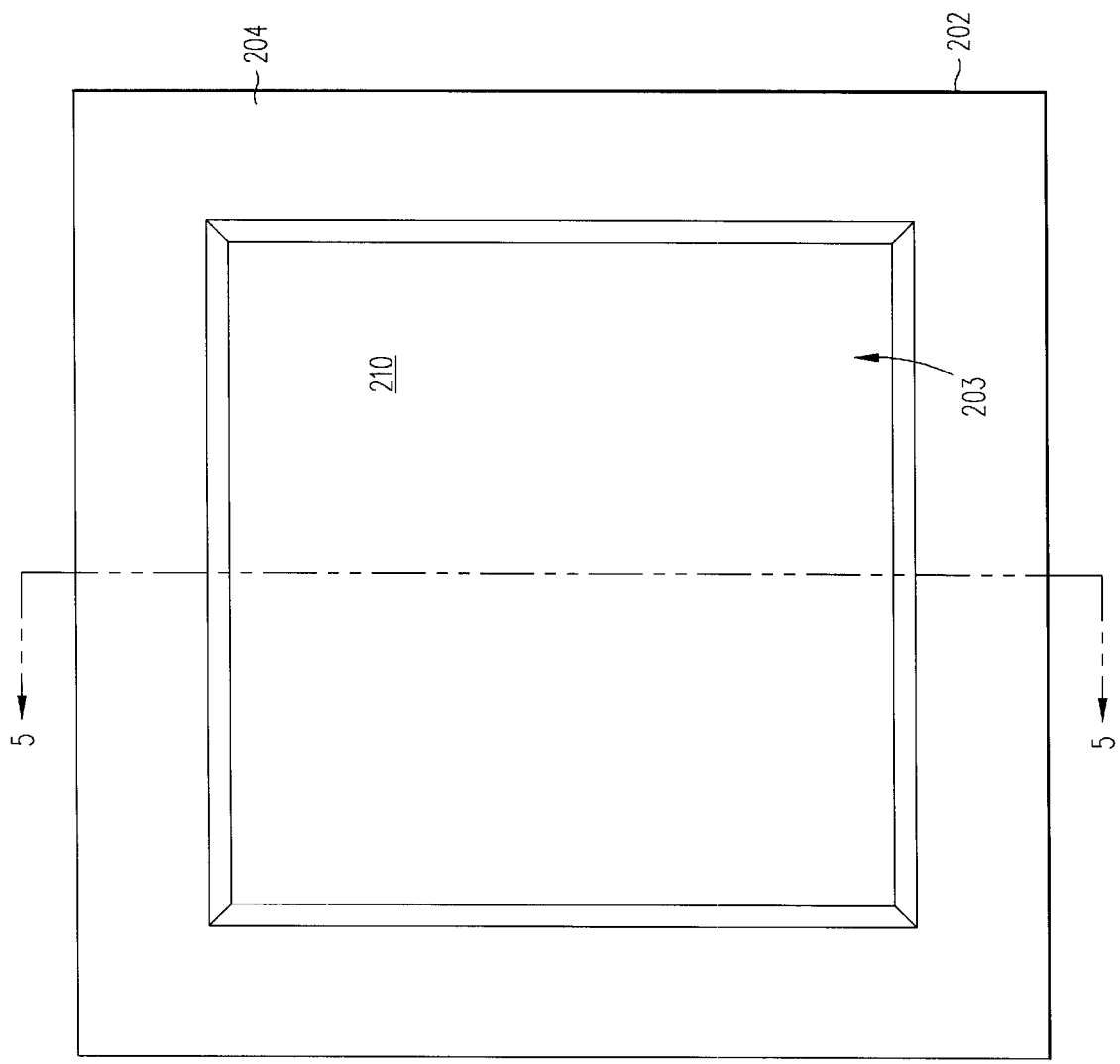
FIG. 4 is a top view of an upper structural member of a micro-switch in accordance with one embodiment of the present invention.

FIG. 4 is a top view of an upper structural member 201 of a micro-switch 1 in accordance with one embodiment of the present invention. As described in more detail below, the upper structural member 201 is joined to the lower structural member 101 to form the completed micro-switch 1. FIG. 5 is a cross sectional view of the upper structural member 201 along section line 5—5 of FIG. 4. FIGS. 4 and 5 use the X-Y-Z coordinate system of FIGS. 1 and 2.

Upper structural member 201 includes a substrate 202. In the described embodiment, substrate 202 is a monocrystalline semiconductor material, such a silicon. However, other structural elements can also be used in other embodiments of the invention. Silicon substrate 202 has dimensions of approximately 0.6 cm along the X-axis, 0.6 cm along the Y-axis, and 400 $\mu$m along the Z-axis. The dimensions of the outer perimeter of the substrate 202 in the X-Y plane is approximately equal to the dimensions of the outer perimeter of the support pads 132 in the lower structural member 101. An opening 203 extends through substrate 202, causing substrate 202 to form a structural frame 204. The dimensions of opening 203 at the lower surface 202A of substrate 202 closely correspond to the dimensions of the inner perimeter of the pattern of support pads 132 on the lower structural member 101.

A low-stress, or silicon rich, silicon nitride membrane 210 extends over the opening 203 at the lower surface 202A of the frame 204. In the described embodiment, the silicon nitride membrane 210 has a thickness of approximately 2,000 Å. In other embodiments, membrane 210 can be made of other materials, such as polyimide, metal or silicon. A thin conductive film 215, having a thickness of approximately 1,000 Å is formed on the lower exposed surface of the membrane 210. In the described embodiment, the conductive film 215 is gold or a gold alloy, although other conductive materials can be used. Membrane 210 and film 215 together form a conductive membrane 216. The intrinsic tensile stress of the membrane 210 tends to hold conductive membrane 216 in a plane which is parallel to the X-Y plane. However, the conductive membrane 216 is compliant along the Z-axis. Thus, when frame 204 is fixed and a force is applied to the conductive membrane 216 along the Z-axis, the conductive membrane 216 deforms slightly to move along the Z-axis. The forces required to deform the conductive membrane 216 are on the order of 250 $\mu$N. The amount of deformation along the Z-axis in the presence of these forces is approximately 0.5 $\mu$m.

FIG. 6 is a cross sectional view illustrating a micro-switch 1 which is formed by connecting the lower structural member 101 and the upper structural member 201. To join the lower and upper structural members 101 and 201, a bonding material 170, such as an adhesive or low-temperature solder, is located on or between the pattern of support pads 132. The upper structural member 201 is then placed into contact with the lower structural member 101, such that the lower surface of the frame 204 is aligned on the support pads 132. The bonding material 170 thereby affixes the frame 204 (via conductive membrane 216) to the support pads 132. The bonding material 170 spills over into the spaces between the support pads 132, thereby minimizing or eliminating the amount of bonding material 170 present at the points of direct contact between the lower and upper structural members 101 and 201. Minimizing the amount of bonding material 170 present at these direct contact points provides for a precise spacing between the lower structural member 101 and the upper structural member 201. In addition, locating the bonding material 170 between the upper and lower structural members provides for a relatively strong bond between these members. The patterned upper surface of the support pads 132 is a somewhat irregular (i.e., non-continuous) surface which advantageously provides for improved bonding. The improved bond between the upper and lower structural members prohibits warping of the frame 204, which could otherwise occur in response to the inherent tensile stresses in the silicon nitride membrane 210. In addition, this improved bond maintains the relative positions of the upper and lower structural members during subsequent packaging steps (e.g., ultrasonic wire bonding to the bond pads 161–164).

Bonding material 170 and the relatively small height of the support pads 132 results in the formation of a virtually air-tight seal between the upper and lower structural members 201 and 101.

In an alternative embodiment, a ring of bonding material can be applied around the outer perimeter of the upper structural member 201 at the interface between the upper structural member 201 and the lower structural member 101. In another embodiment, other low melting temperature metals (such as indium or eutectic gold) or other materials (such as silicon oxide) can be deposited on or between the support pads 132 and/or the conductive membrane 216, such that the lower structural member 101 can be joined to the upper structural member 201 by applying a combination of pressure, temperature and voltage (e.g., anodic bonding).

When the upper structural member 201 is attached to the lower structural member 101, the conductive membrane 216 is stretched over the upper surfaces of the spacer pads 131 (FIG. 6). This occurs because the uppermost surfaces of the spacer pads 131 are located higher along the Z-axis than any of the other elements of the lower structural member 101. In the described embodiment, the uppermost surfaces of the spacer pads 131 are located approximately 500 Å higher (along the Z-axis) than the uppermost surfaces of the support pads 132. In addition, the uppermost surfaces of the spacer pads 131 are located approximately 1000 Å higher (along the Z-axis) than the uppermost surfaces of the contact pads 151–153. Spacer pads 131 therefore prevent the conductive membrane 216 from inadvertently contacting the contact pads 151–153. Spacer pads 131 also add tension to the conductive membrane 216, thereby improving the mechanical properties (e.g., stiffness) of the conductive membrane 216. The distance between the conductive membrane 216 and the contact pads 151–153 along the Z-axis (i.e., the micro-switch gap) is approximately equal to difference in thickness in the insulating layer 121 between regions 13 and 15 of the insulating layer 121. Thus, the micro-switch gap can be accurately controlled by controlling the thickness of the insulating layer 121.

In prior art micro-switches, the micro-switch gap has been heavily influenced by a multiplicity of processing variables (i.e., the height of the contact pads, the height of the surrounding pedestal, the thickness of the bonding material, the residual stress and any possible permanent distortion of the conductive membrane). However, in the present invention, the micro-switch gap is heavily influenced by only one processing variable (i.e., the height of the insulating layer 121 at different locations), thereby resulting in better control over the micro-switch gap, and therefore the switch sensitivity.

As previously alluded to in connection with FIG. 3, the conductive membrane 216 does not short the conductive traces 141–143, because the conductive traces 141–143 are located between the support pads 132 and are lower than the support pads 132. However, the conductive membrane 216 does contact the patterned metal layer 122 at the upper surfaces of the support pads 132. As a result, the portion of the patterned metal layer 122 which does not form traces 141–143, contact pads 151–153 and bond pads 161–163 (hereinafter referred to as the bond pad 164) is electrically connected to the conductive membrane 216.

Micro-switch 1 operates as follows. During stable atmospheric conditions (i.e., 1 ATM, no ambient air flow) or when there is equal pressure on both sides of the membrane, micro-switch 1 remains in the position illustrated in FIG. 6. That is, conductive membrane 216 is electrically isolated from contact pads 151–153. As a result, an open circuit exists between each of the bond pads 161–164.

However, when the atmospheric conditions cause an external pressure to be applied to micro-switch 1, (i.e., a pushing or pulling force from the positive Z-direction to the negative Z-direction), the conductive membrane 216 deforms in the negative Z-direction, thereby causing the film 215 of the conductive membrane 216 to contact one or more of the contact pads 151–153. When conductive membrane 216 contacts one of the contact pads, a closed circuit exists between the bond pad 164 and the bond pad corresponding to the contact pad which is contacting the conductive membrane 216. Thus, a closed circuit will exist between bond pad 164 and bond pad 161 when the conductive membrane 216 has deformed sufficiently to contact the contact pad 151. Similarly, when conductive membrane 216 contacts a second contact pad, a closed circuit exists between the bond pad corresponding to the second contacted pad and bond pad 164. Thus, a closed circuit will exist between bond pad 164 and bond pad 162 when the conductive membrane 216 has deformed sufficiently to contact both contact pad 151 and contact pad 152.

The irregular spacing between the contact pads 151–153 is provided to facilitate the detection of different degrees of deformation of the conductive membrane 216. For example, a relatively small degree of deformation is required to provide a closed circuit between bond pads 161 and 164, while a greater degree of deformation is required to create a closed circuit between bond pads 162 and 164. An even greater amount of deformation is required to provide a closed circuit between bond pads 163 and 164. The sensitivity can be controlled by both the location and the thickness difference of the contact pads.

Cavity 114 helps to prevent sub-micron dust particles from changing the sensitivity of the conductive membrane 216. Thus, if dust particles somehow become present between the conductive membrane 216 and the lower structural member 101, the cavity 114 will provide clearance for the dust particles, such that the dust particles do not cause additional deformation of the conductive membrane 216 when the conductive membrane 216 is in the closed position.

In addition, metal layer 122 can be completely removed at selected areas adjacent to the contact pads 151–153, thereby exposing the underlying insulating layer 121. These exposed insulating pockets can act as traps for sub-micron particles. That is, sub-micron dust particles tend to stick to the surface of insulating layer 121 due to static electricity, thereby preventing the particles from interfering with the operation of the micro-switch 1.

Although the micro-switch 1 has been defined as having particular dimensions, these dimensions are illustrative and not limiting. Other dimensions are possible and considered to be within the scope of the present invention.

As previously described, the micro-switch 1 has been defined as a device which detects the contact (or absence of contact) between the conductive membrane 216 and the contact pads 151–153. However, micro-switch 1 alternatively be used as an analog sensor which provides a response which is related to the proximity between the conductive membrane 216 and the contact pads 151–153, thereby providing an analog signal which is proportional to the air flow (as opposed to a digital signal corresponding to a threshold). To accomplish this, bonding pads 161–164 are coupled to a conventional capacitance sensor circuit (not shown). This capacitance sensor circuit measures the capacitance between the conductive membrane 216 and contact pads 151–153. The closer the conductive membrane 216 is to the contact pads 151–153, the greater the measured capacitance. To maximize the measured capacitance, the three contact pads 151–153 can be replaced with a single large contact pad. In one embodiment, this single large contact pad has a circular shape which is defined by the inner perimeter of the pattern of spacer pads 131.

Figure 7A:
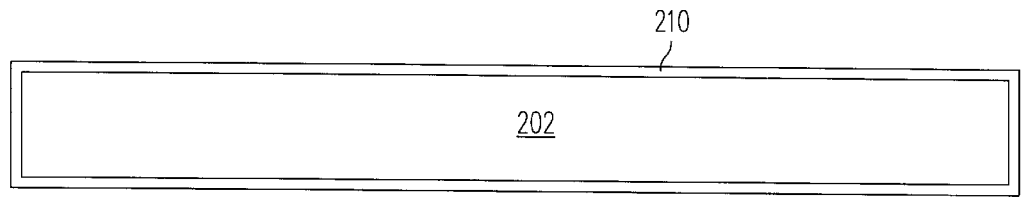
FIGS. 7A–7D are cross sectional views illustrating the upper structural member of FIG. 4 during selected processing steps.
Figure 7B:
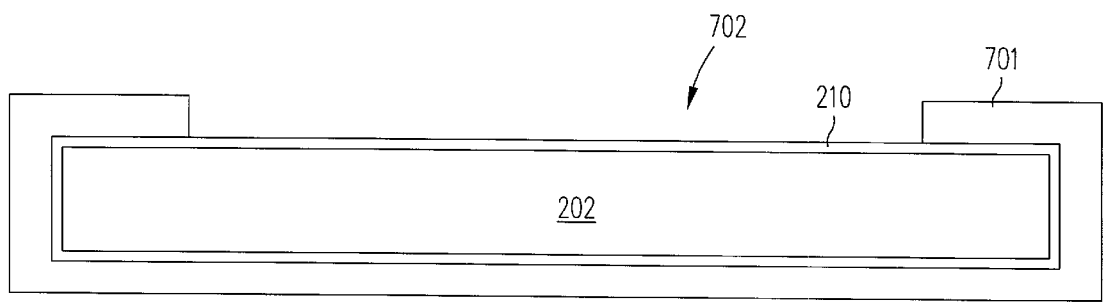

A method for making micro-switch 1 will now be described. FIGS. 7A–7D illustrate the upper structural member 201 during particular processing steps. Initially, monocrystalline silicon substrate 202 is cleaned. Then, as illustrated in FIG. 7A, a layer of silicon nitride 210 is deposited over the outer surfaces of a the substrate 202. In the described method, the silicon nitride layer 210 has a thickness of approximately 2000 Å, although other thicknesses are possible. As shown in FIG. 7B, a photoresist layer 701 is then deposited over the silicon nitride layer 210. The photoresist layer 701 is patterned to define an opening 702. In the described method, this opening 702 has a square shape.

Figure 7C:
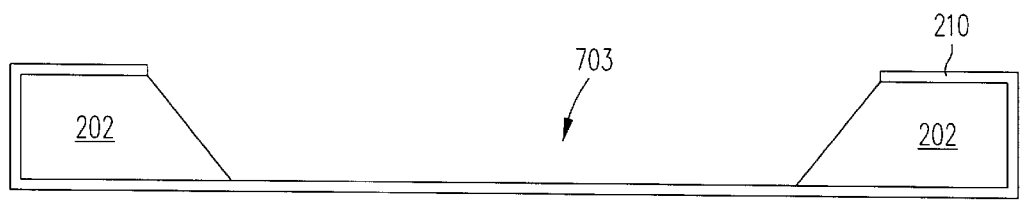

Turning now to FIG. 7C, a plasma etch is then performed to remove the portion of the silicon nitride layer 210 which is exposed by the opening 702. After removing the photoresist, a KOH etch is then performed on the resulting structure. As shown in FIG. 7C, the KOH etch forms an opening 703 which extends through the substrate 202.

Figure 7D:
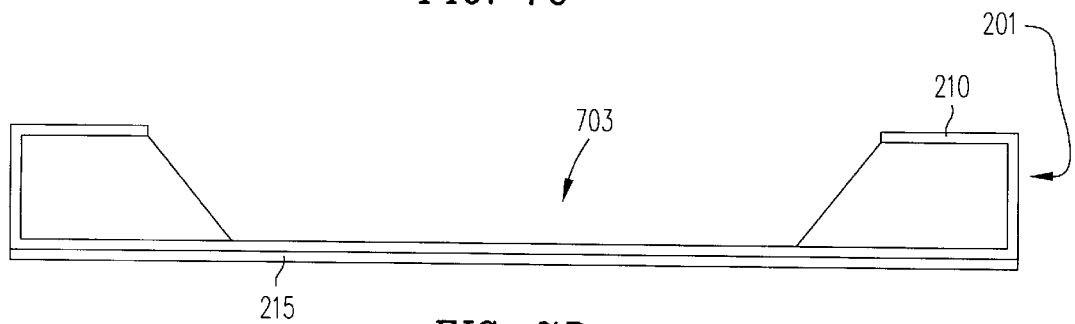

Because the KOH etch does not attack the silicon nitride layer 210, the silicon nitride layer 210 remains as a membrane across opening 703. As shown in FIG. 7D, a layer of gold 215 having a thickness of approximately 1000 Å is evaporated (or sputtered) over the entire lower surface of the silicon nitride layer 210, thereby completing the fabrication of the upper structural member 201 (FIG. 7D). Etchants other than KOH can be used in other embodiments of the invention.

Although FIGS. 7A–7D illustrate the fabrication of a single upper structural member 201, it is understood that many upper structural members similar to upper structural member 201 can be simultaneously (i.e., batch) fabricated on a silicon wafer. These upper structural members can be cut into individual upper structural members in accordance with well known semiconductor processing techniques. Alternatively, these upper structural members can be used as an integrated array of upper structural members which are attached to a corresponding integrated array of lower structural members.

Figure 8A:
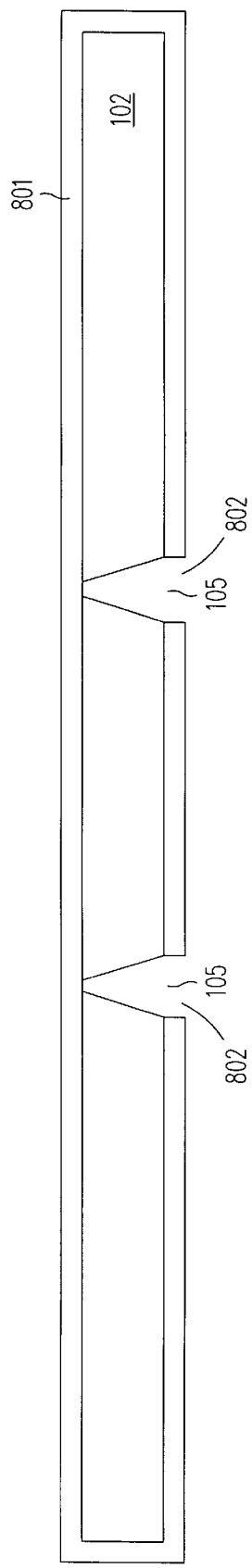

FIGS. 8A–8H are cross sectional views of the lower structural member 101 during selected processing steps. Initially, monocrystalline silicon substrate 102 is cleaned. Then, as illustrated in FIG. 8A, the substrate 102 is thermally oxidized such that a layer of oxide 801 having a thickness of approximately 1 μm is grown on the external surfaces of the substrate 102. A first photoresist mask (not shown) is patterned on the oxide layer 801 at the lower surface of the substrate 102. The first photoresist mask includes a number of rectangular openings which define the locations of holes 105. The portions of the oxide layer 801 which are exposed by these openings are removed such that there are a number of openings 802 formed in oxide layer 801 at the bottom surface of the silicon substrate 102. The substrate 102 is then etched from its back side using KOH which attacks the silicon through openings 802. The back side etch continues until holes 105 extend through the substrate 102.

Figure 8B:
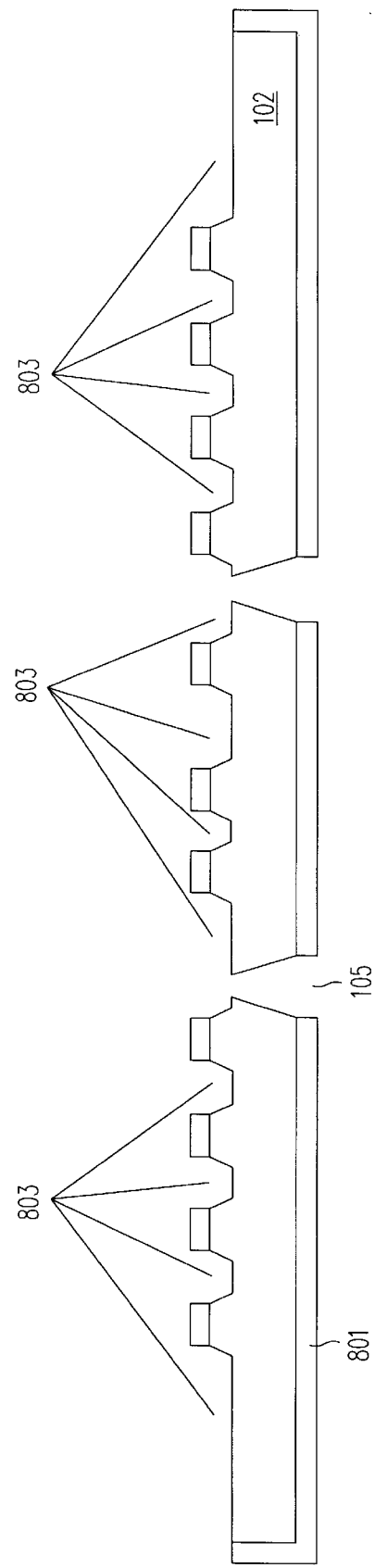

A second photoresist mask (not shown) is then patterned on the oxide layer 801 at the upper surface of the substrate 102. The second photoresist mask has a pattern which defines cavity 114 (and thereby defines the locations of spacer pads 131, support pads 132, and contact pads 151–153). The portions of the oxide layer 801 which are exposed by the second photoresist mask removed such that there are a number of openings 803 formed in oxide layer 801 at the upper surface 102A of the silicon substrate 102 (FIG. 8B). The substrate 102 is then etched to a depth of approximately 5 microns using KOH which attacks the silicon through openings 803.

Figure 8E:
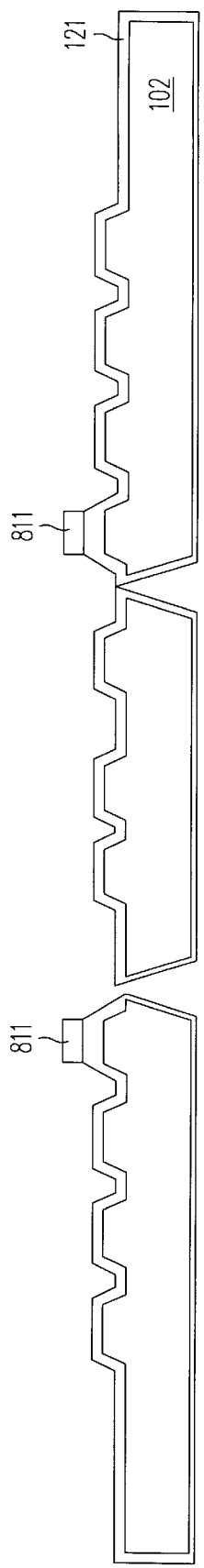
Figure 8F:
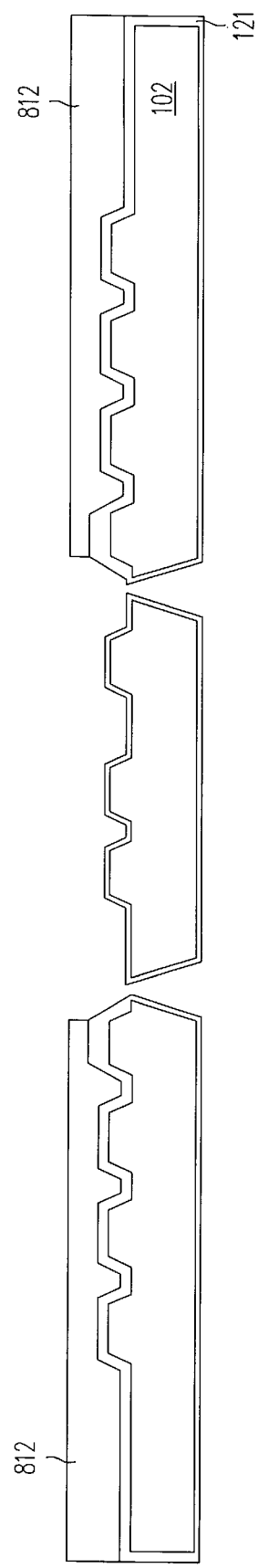
Figure 8G:
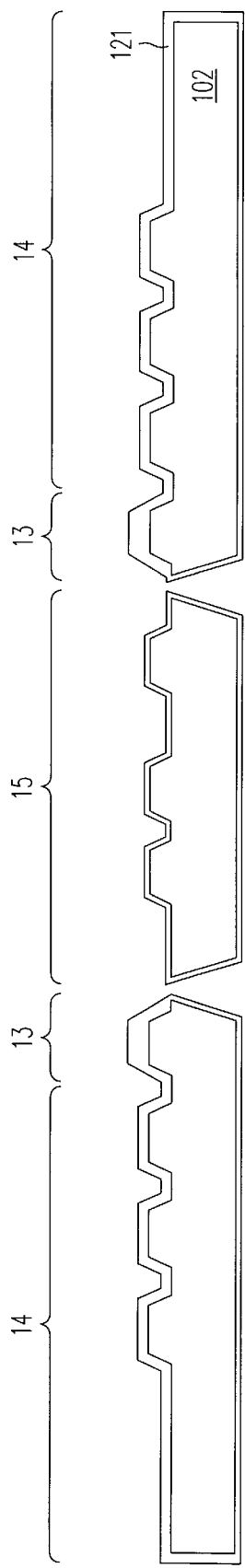

The first oxide layer 801 is then completely stripped, and a second oxide layer 121 having a thickness of approximately 1 micron is then thermally grown over the outer surface of the substrate 102. (FIG. 8C). A photoresist mask 811 is formed over the upper surface of the second oxide layer 121 (FIG. 8D). The photoresist mask 811 defines the region 13 of the insulating layer 121 (i.e., the locations of the spacer pads 131). A controlled oxide etch is then performed to remove approximately 500 Å of the second oxide layer 121 as illustrated in FIG. 8E. The first photoresist mask 811 is then stripped. A second photo resist mask 812 is formed as illustrated in FIG. 8F. The second photoresist mask 812 covers the pattern of spacer pads 131 and all regions outside of the pattern of spacer pads 131 (including the support pads 132). Another controlled oxide etch is then performed to remove another 500 Å of thickness from the portions of the second oxide layer 121 which are not covered by the second photoresist mask 812. The second photoresist mask 812 is then stripped, resulting in the structure of FIG. 8G. As illustrated, the two controlled etches result in the formation of regions 13, 14 and 15 within insulating layer 121. If necessary, additional steps can be carried out such that the various contact pads will have different thickness.

Alternatively, a single layer of photoresist can be used to pattern insulating layer 121. Initially, openings are patterned into the photoresist layer to allow the areas of insulating layer 121 which will have the lowest height to be etched first (e.g., region 15). The same photoresist layer is then re-patterned to form additional openings which expose the areas of insulating layer 121 which will have the next lowest height (e.g., region 14). A second etch is then performed to remove areas of insulating layer 121 which are exposed by the original openings and the additional openings. This sequence is repeated until insulating layer 121 has the desired pattern.

Figure 8H:
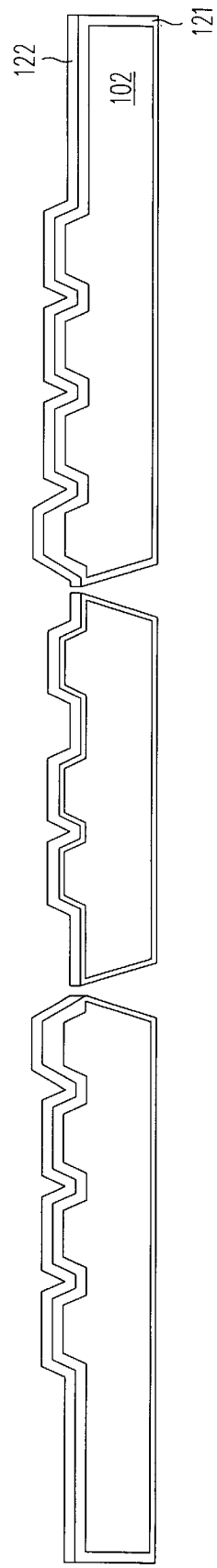

A blanket metal layer 122 is formed, for example, by sputtering gold or a gold alloy over the upper surface of the resulting structure (FIG. 8H). The metal layer 122 is then patterned to form trenches 171–173, thereby resulting in the lower structural member 101 illustrated in FIG. 2. The metal layer 122 is patterned, for example, by forming a photoresist mask (not shown) which defines the desired pattern trenches 171–173, etching away the metal located in trenches 171–173, and stripping the photoresist mask. In other embodiments, the metal layer 122 can be made from other metals or metal alloys. In yet other embodiments, metal layer 122 can be replaced with a conductive layer formed by selective doping of the silicon substrate.

Alternative Embodiments

Figure 9:
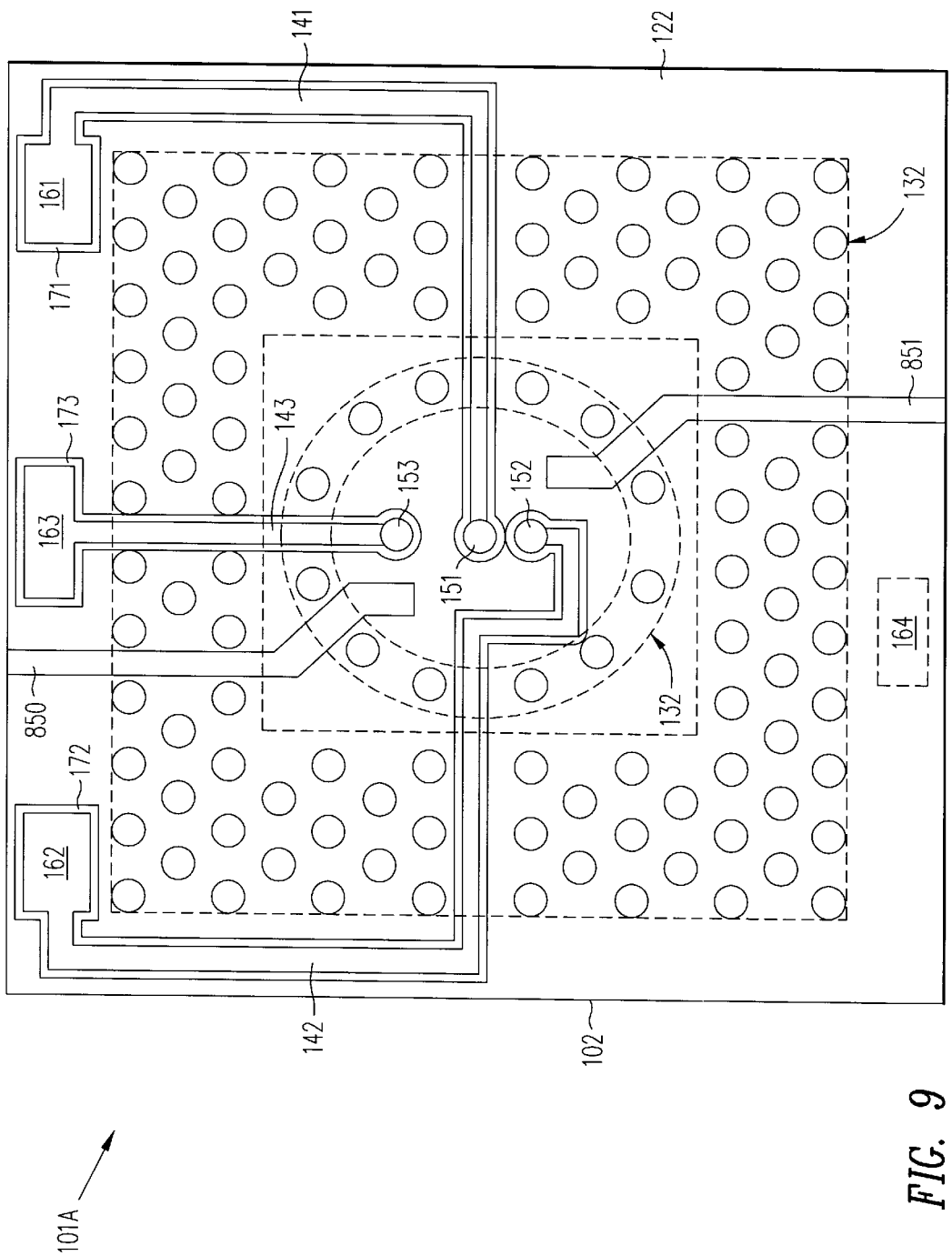
FIG. 9 is a top view of a lower structural member of a micro-switch having channels in accordance with an alternative embodiment of the invention.

In an alternative embodiment, the holes 105 can be mechanically or ultrasonically drilled into the substrate. In an alternative embodiment of the present invention, the holes 105 which extend through substrate 102 are replaced with one or more channels located in the upper surface 102A of the substrate 102. FIG. 9 is a top view of a lower structural member 101A formed in accordance with this embodiment. Similar elements in FIGS. 1 and 9 are labeled with similar reference numbers. Channels 850 and 851 extend between the outer perimeter of the substrate 102 and the central region of the substrate 102 (i.e., the region located within the pattern of spacer pads 131). These channels 850–851 are deep enough to allow air to pass to the lower surface of the conductive membrane 216, even after the upper structural member 201 is joined to the lower structural member 101A. In one example, channels 850 and 851 have a depth of approximately 20 μm. Because the holes 105 extending through the substrate 102 are not necessary in this embodiment, the substrate 102 can be made thicker (along the Z-axis) and therefore more sturdy, or made of material that does not lend itself to anisotropic chemical etching (e.g., glass or metal).

Figure 10:
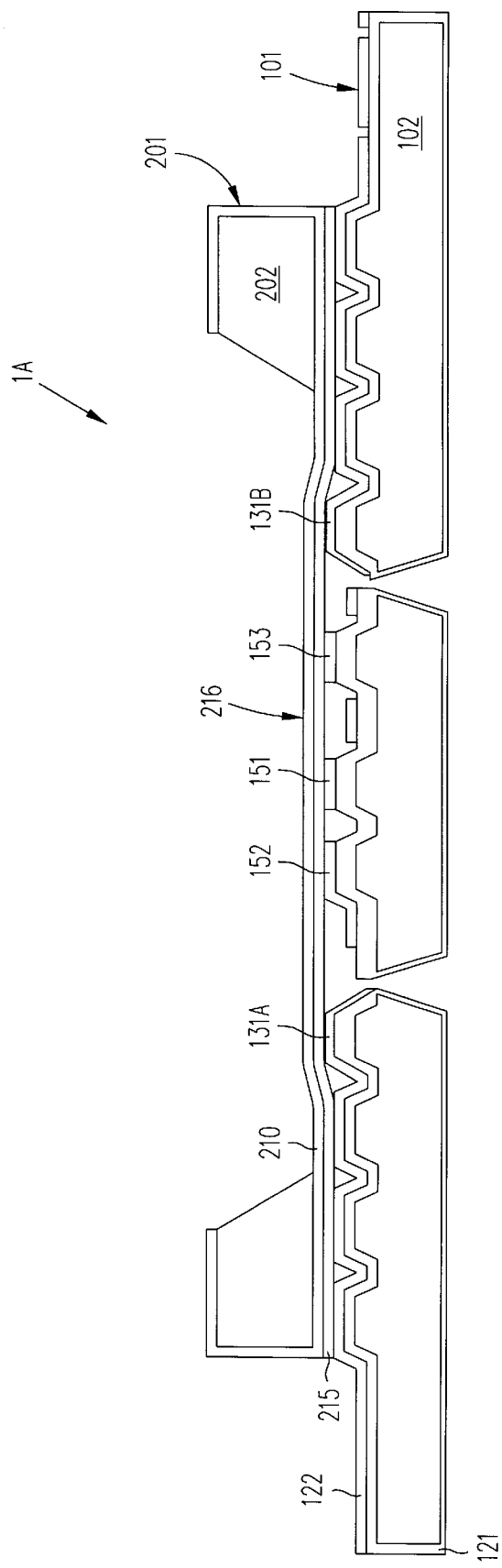
FIG. 10 is a cross sectional view of a normally-closed micro-switch in accordance with an alternative embodiment of the invention.

In another embodiment of the invention, the normally-open micro-switch 1 can be modified to make a normally-closed micro-switch. To accomplish this, the patterned insulating layer 121 is modified such that the contact pads 151–153 are slightly higher (along the Z-axis) than the spacer pads 131 and the support pads 132. In a variation of this embodiment, the patterned insulating layer 121 is modified such that the contact pads 151–153 have the same height as the spacer pads 131. In both variations of this embodiment, the spacer pads 131 are slightly higher than the support pads 132 along the Z-axis. FIG. 10 is a cross sectional view of a normally closed micro-switch 1A in accordance with this embodiment of the invention. Similar elements in FIGS. 10 and 6 are labeled with similar reference numbers.

In yet another embodiment of the invention, the thin conductive film 215 located on the flexible membrane 210 (previously described as being gold) is made of a magnetic material, such as permalloy. In this embodiment, the micro-switch 1 becomes a magnetic switch which can be actuated by an external magnetic field. This magnetic field can be introduced by either a permanent magnet or an electromagnet (which can be located external to micro-switch 1 or fabricated as part of micro-switch 1).

Applications

Various applications of the micro-switches 1 and 1A will now be described. The applications described below are intended to be illustrative, but not limiting. It is understood that the micro-switches of the present invention can be used in many other applications, which would be apparent to one of ordinary skill in the art.

Air flow detector

Micro-switch 1 can be used in a variety of applications. As illustrated in FIG. 11, the micro-switch 1 is packaged to form a micro-switch assembly 900. Micro-switch assembly 900 includes an upper molding 901 and a lower molding 902, each of which can be made of plastic. The upper molding 901 is fixed on the lower molding 902 such that an air-tight seal is formed between these two moldings. Micro-switch 1 is affixed to the lower molding 902, such that an air-tight seal is formed. Two cavities 903 and 904 extend through the lower molding 902. Micro-switch 1 is positioned over cavity 904, such that the lower surface of the lower structural member 101 is exposed within cavity 904. As a result, the lower surface of the conductive membrane 216 is exposed to cavity 904 through holes 105. Cavity 903 extends through lower molding 902 at a location outside of the perimeter of the micro-switch 1. As a result, the upper surface of the conductive membrane is exposed to cavity 903.

Air flow tubes 910 and 911 are fitted into cavities 903 and 904 respectively. Air flow tubes 910 and 911 are hollow tubes which are open at their uppermost ends, and closed at their lowermost ends. Openings 930 and 931 are located on the face surfaces of tubes 910 and 911, respectively. Filters 920 and 921 are located over the uppermost ends of air flow tubes 910 and 911, respectively. Filters 920 and 921 prevent particles from entering housing 900 and changing the operating characteristics of the conductive membrane 216.

The various bond pads 161–164 of micro-switch 1 can be connected to connector pins (such as connector pin 905) by bonding wires (such as bonding wire 950).

The resulting structure operates as follows. The micro-switch assembly 900 is mounted in a location where there is an expected air flow. The micro-switch assembly 900 is aligned such that opening 930 is facing into the direction of expected air flow, and opening 931 is facing away from the direction of the expected air flow. FIG. 12 is a top view of air flow tubes 910 and 911. Arrows 1010 indicate the direction of expected air flow. When such an air flow exists, a positive pressure P1 results through opening 930, and a negative pressure P2 results through opening 931. Opening 931 must be located at least 90 degrees out of phase with the expected direction of the air flow in order for a negative pressure (vacuum) P2 to be developed. When the expected air flow exists, the pressure difference between P1 and P2 tend to force the normally-open micro-switch 1 into a closed position. Conversely, when the expected air flow is not present, the pressures P1 and P2 (which are approximately equal) will leave the normally-open micro-switch 1 in an open position. By providing a positive pressure P1 on one side of the membrane 216, and a negative pressure P2 on the other side of the membrane 216, a relatively large force is applied to actuate micro-switch 1. In an alternate embodiment, air flow tubes 910 and 911 can be replaced with a single air flow tube having two inner channels, with one hole connecting to each of the inner channels.

In addition, instead of a single hole in each of air flow tubes 910 and 911, each of air flow tubes 910 and 911 can include two or more holes, with each hole being located at a slightly different angle relative to the air flow, but all joining to the same cavity (e.g., 903 or 904). In one example, two holes are provided with an angle of approximately five degrees between the two holes. Providing two holes enables air flow tubes 910 and 911 to be positioned with a lower degree of accuracy relative to the direction of air flow. However, with each additional hole added per air flow tube, the detected pressure decreases, giving a slight reduction in sensitivity. In yet another embodiment, holes 930 and 931 can be replaced with horizontal slit openings. Such slit openings relax the required orientation requirements of the air flow tubes with respect to the direction of air flow.

The micro-switch assembly 900 can be mounted near a fan in a computer system, or near an electronic component to be protected. Micro-switch 1 thereby receives the air flow created by the fan. When the air flow is greater than a predetermined threshold, the conductive membrane 216 will deform into contact with one or more of the contact pads 151–153 of the micro-switch 1 to form a closed circuit. The presence of this closed circuit is then interpreted to indicate the presence of an adequate air flow in the system. Alternatively, a capacitance sensor can be used as previously described to determine the proximity of the conductive membrane 216 to the contact pads 151–153. This proximity can then be used generate an analog signal which is proportional to the actual air flow in the system. The threshold of the micro-switch 1 can be determined by adjusting the location of the micro-switch 1 both radially or axially with respect to the fan, or by changing the sensitivity of the micro-switch. Because the micro-switch 1 immediately detects failure or the sub-optimal operation of the fan, overheating of the electronic components in the system can be prevented at an earlier stage than when using conventional temperature sensing devices.

Figure 13:
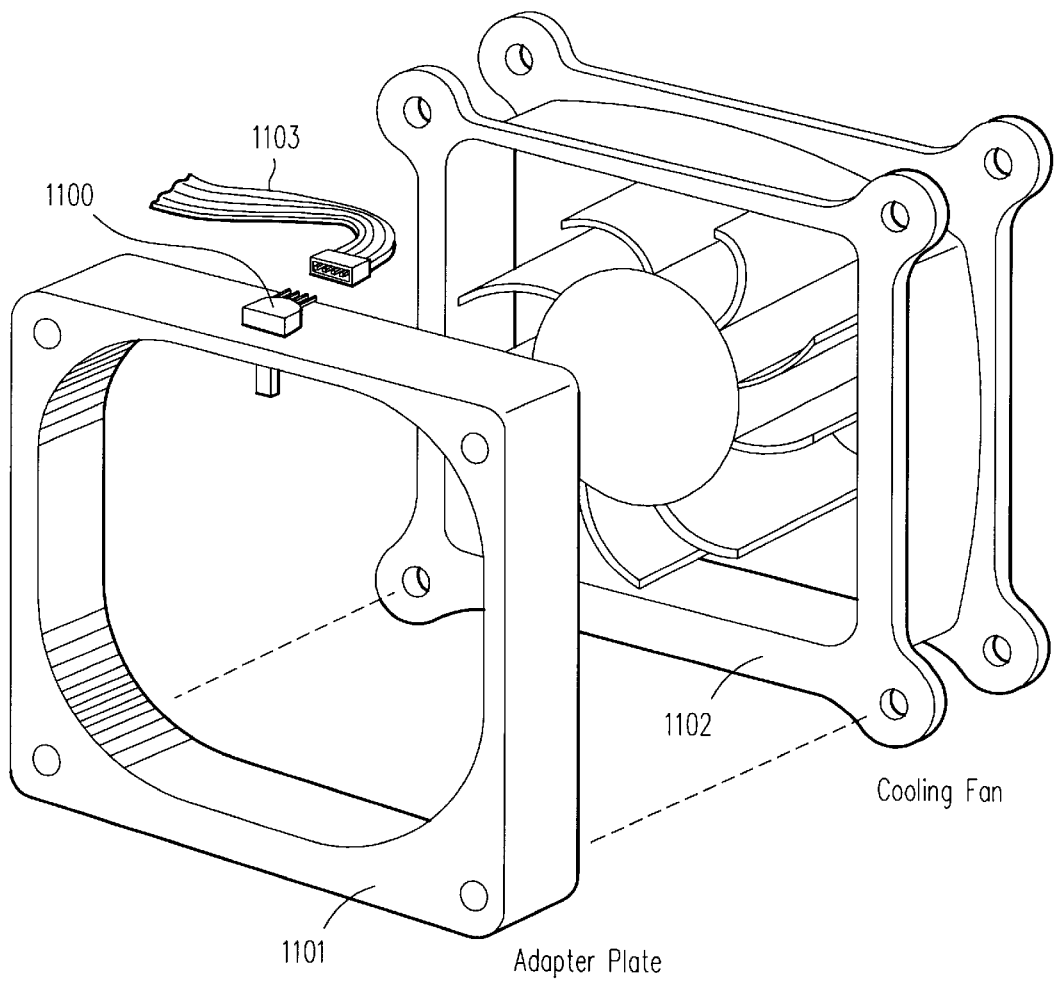
FIG. 13 is an isometric view of the micro-switch assembly of FIG. 11 mounted on an adapter plate.

FIG. 13 is an isometric view of a micro-switch assembly 900 which is mounted on an optional adapter plate 1101, or as part of the fan. The adapter plate 1101 is attached to the inlet (or outlet) side of a cooling fan 1102. Air flow tubes 910 and 911 extend through an opening in the adapter plate 1101, thereby exposing the air flow tubes 910 and 911 to the air flow created by the fan 1102. An electrical connector 1103 couples the connector pins of the micro-switch assembly 900 to the cooling control system (not shown).

Figure 14:
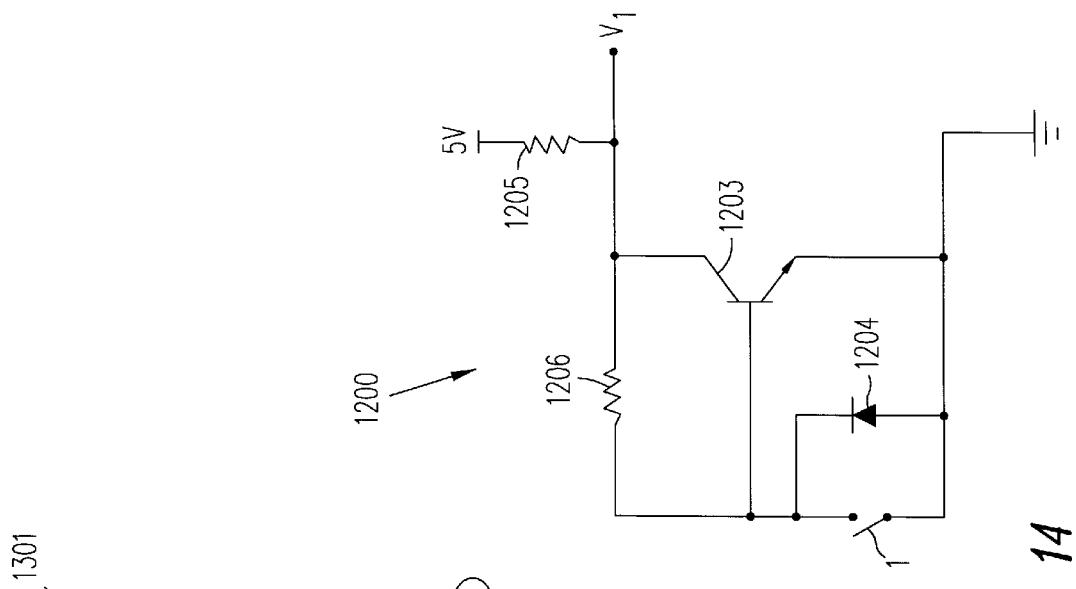
FIG. 14 is a schematic diagram of a circuit which is included within the micro-switch assembly of FIG. 11 in accordance with one embodiment of the invention.

FIG. 14 is a schematic diagram of a circuit 1200 which can be included within micro-switch assembly 900. Circuit 1200 can be implemented using integrated circuitry or discrete components. The supply voltages of 5 volts and ground are supplied from outside of micro-switch assembly 900 via connector pins. Circuit 1200 includes NPN bipolar transistor 1203, diode 1204, and resistors 1205 and 1206. When micro-switch 1 is in an open position, transistor 1203 is turned on by the voltage drop across reverse biased diode 1204. Because transistor 1203 is turned on, the output voltage V1 is approximately equal to ground. When micro-switch 1 is in a closed position, transistor 1203 is turned off (because the base of transistor 1203 is pulled to ground by the closed micro-switch 1). As a result, the output voltage V1 is pulled up to a positive voltage. Resistor 1206 is included to limit the current through micro-switch 1 when micro-switch 1 is in a closed position.

In accordance with the present invention, a plurality of micro-switch assemblies, identical to micro-switch assembly 900, can be located throughout the system to be protected. Such an arrangement can detect localized areas of sub-optimal fan performance.

In addition to being a warning sensor, such a device can be used as a feedback sensor to control the rotational speed of a fan such that for a given system or ambient temperature, the fan can be controlled to rotate at whatever speed necessary to achieve the desired air flow. Alternatively, the number of operational fans can be controlled to achieve the desired air flow. Such an adaptive (or 'smart') fan can be used in applications where fan noise is a problem or where system reliability is a major concern.

Temperature sensor

Figure 15:
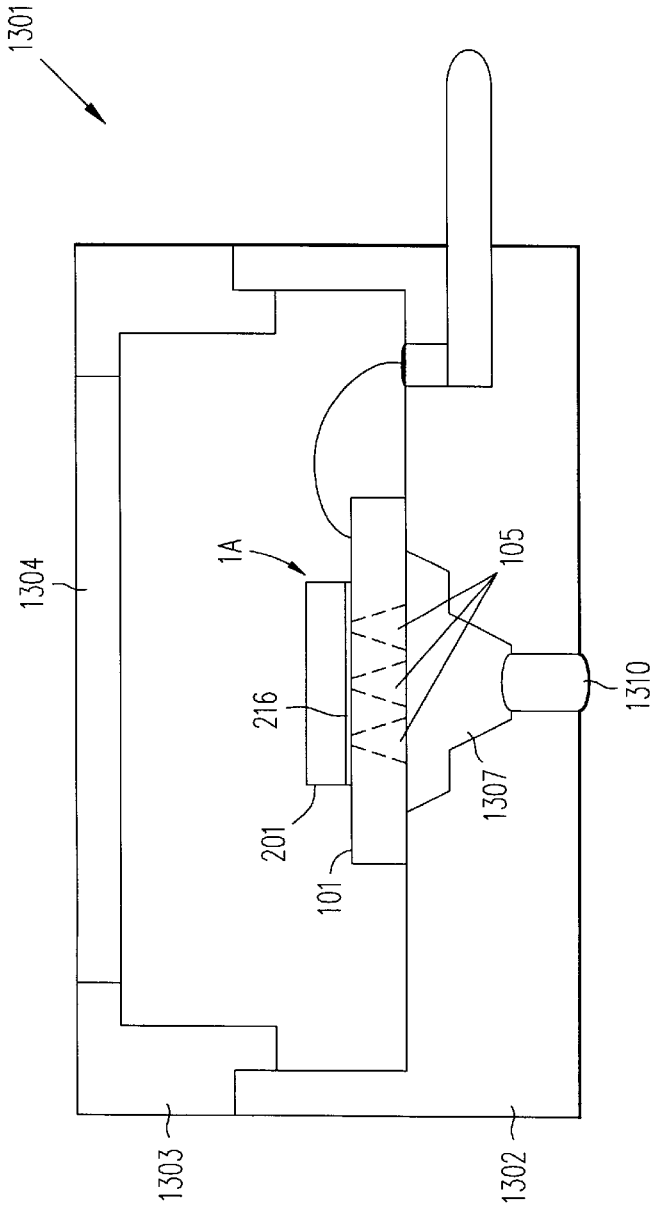
FIG. 15 is a cross sectional view of a micro-switch which is adapted for use as temperature sensor in accordance with one embodiment of the invention.

As illustrated in FIG. 15, in accordance with an alternative embodiment of the present invention, normally closed micro-switch 1A can be used to form a temperature sensor 1301. Temperature sensor 1301 includes a lower housing member 1302 and an upper housing member 1303. A cavity 1307 extends through the lower housing member 1302. The lower structural member 101 of the micro-switch 1A is affixed to the lower housing member 1302 with an air-tight seal, such that the holes 105 in the lower structural member 101 are exposed by cavity 1307. The upper housing member 1303 is affixed to the lower housing member 1302. The upper housing member 1303 includes a filter 1304 which allows for the passage of air, but not particles which could damage the conductive membrane 216. While controlling the ambient temperature, the cavity 1307 is sealed (air tight) with a plug 1310. As a result, cavity 1307 becomes a closed cavity which contains a fixed amount of air. When this air is heated, it expands, thereby causing the conductive membrane to deform and open the normally closed micro-switch 1A. By controlling the temperature at which the assembly 1301 is sealed and the sensitivity of the switch, the operating characteristics of the switch can be controlled. For example, the assembly 1301 can be sealed at room temperature. When the ambient temperature increases, the gas sealed in cavity 1307 expands, thereby deforming the conductive membrane 216 and causing the micro-switch 1A to open. In another example, a normally open micro-switch 1 can be mounted upside down on lower housing member 1302 to achieve similar results. In this example, the upper structural member 201 would be affixed to the lower housing member 1302, such that the frame 204 laterally surrounds the cavity 1307. In yet another example, the assembly 1301 can include a normally open micro-switch 1 which is sealed at a high temperature. At ambient room temperature, the gas sealed in cavity 1307 contracts, thereby deforming the conductive membrane 216 and causing micro-switch 1 to close. As the ambient temperature increases, the gas sealed in cavity 1307 expands, thereby opening micro-switch 1.

Temperature sensor 1301 can be used to detect when the ambient temperature exceeds (or drops below) a predetermined temperature by detecting when the conductive membrane 216 contacts (or stops contacting) the contact pads 151–153. Alternatively, temperature sensor 1301 can be used to measure the ambient temperature by sensing the capacitance between the conductive membrane 216 and the contact pads 151–153.

Temperature sensor 1301 is a relatively sensitive device. Assuming that the temperature sensor assembly 1301 is sealed at 15 psi and 300° K, a change of temperature of 5° K (approximately 1%) will result in a change in pressure of approximately 0.15 psi. This change in pressure is more than adequate to actuate the micro-switch 1A. The pressure and temperature at which the micro-switch 1A is sealed can be controlled to give the resulting temperature sensor different switching characteristics. A combination of the air flow switch and temperature switch can be used to optimally control the rotational speed of a "smart" fan to result in the desired cooling performance, as previously described.

Vacuum Detector

Figure 16:
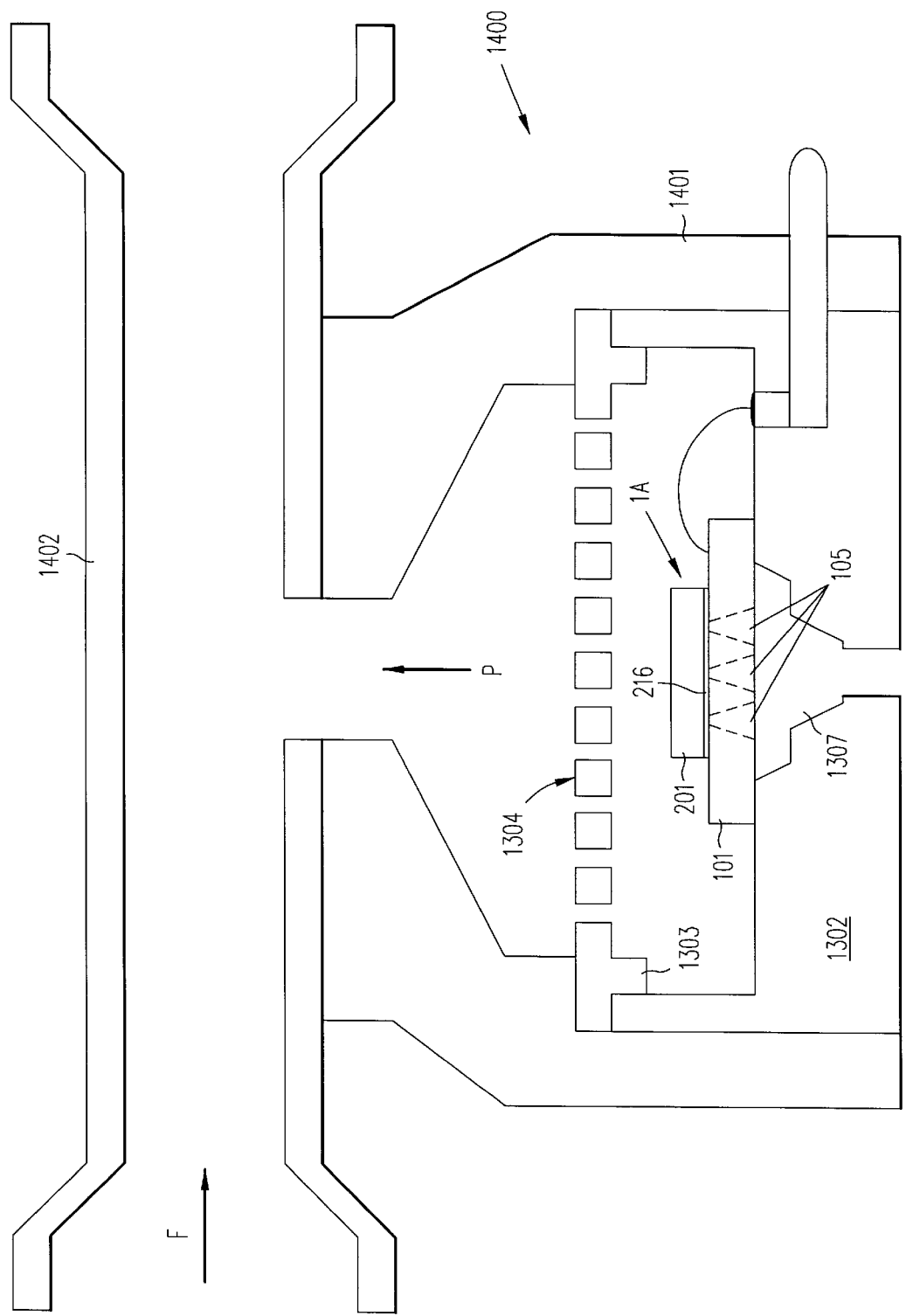
FIG. 16 is schematic diagram of a vacuum sensing micro-switch in accordance with another embodiment of the invention.

In another application, the micro-switch 1A can be used to detect vacuum (or pressure) in a chamber or air flow by detecting a vacuum in a channel, such as in an air conditioning system, a furnace or in semiconductor processing equipment. FIG. 16 is a schematic diagram of a vacuum micro-switch 1400 in accordance with another embodiment of the invention. The vacuum micro-switch 1400 includes a normally closed micro-switch 1A which is mounted in an assembly similar to that previously described in connection with temperature sensor 1301. Thus, micro-switch 1A is mounted on a lower housing 1302, over a cavity 1307 which exposes holes 105. An upper housing 1303 having a filter 1304 is attached to the lower housing 1302. The lower housing 1302 and upper housing 1303 are fitted into a larger housing 1401 which is tapped off of an air flow tube 1402 (e.g., a venturi). In the absence of air flow through tube 1402, the micro-switch 1A is closed. However, when an air flow F is introduced in tube 1402, the micro-switch 1 is pulled open by the negative pressure P induced in the housing 1401. Again, the capacitance of micro-switch 1 can be measured to determine the level of air flow F in tube 1402.

Pitot Tube

Figure 17:
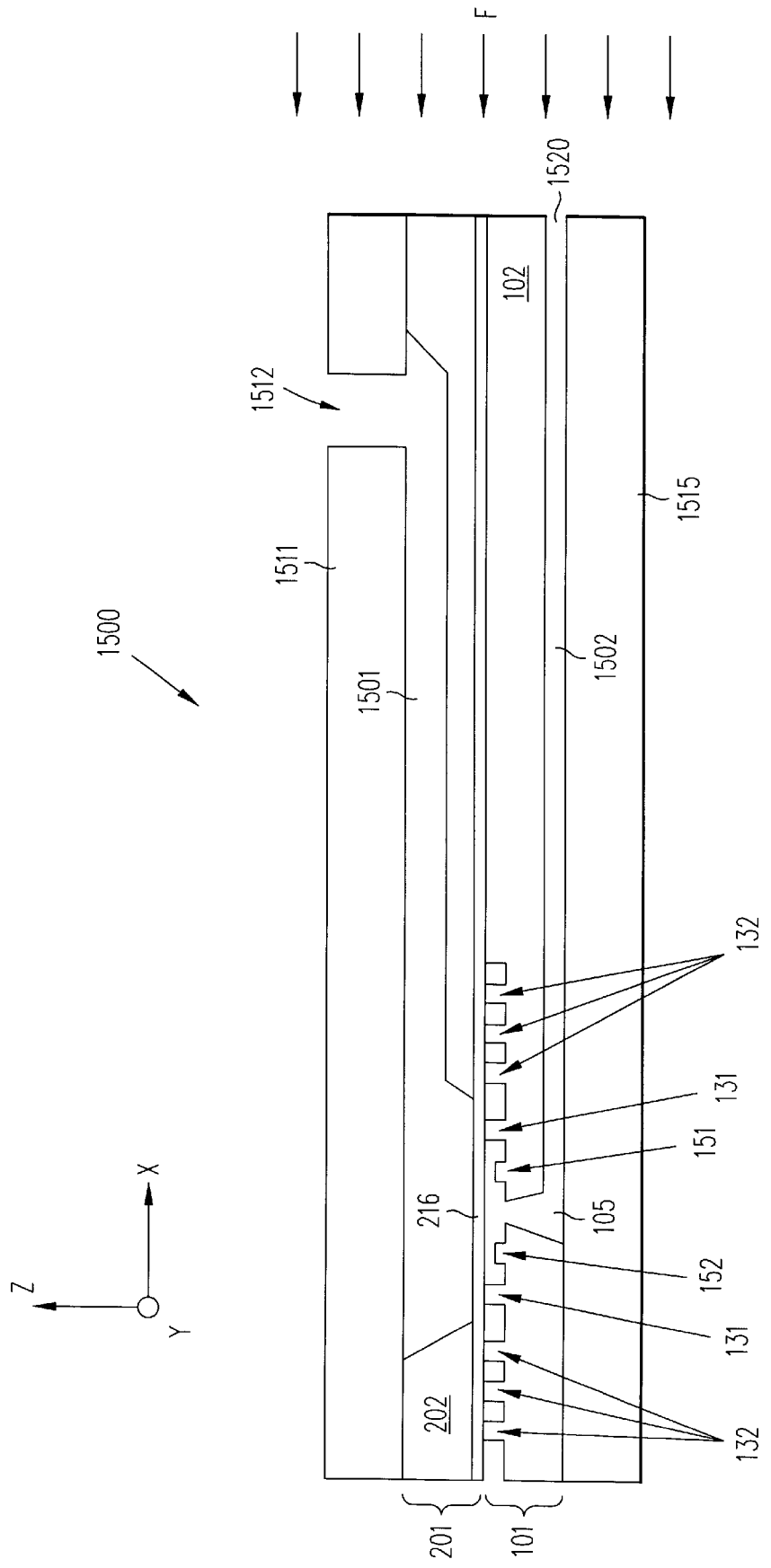
FIGS. 17, 18 and 19 are cross sectional views of pitot tube structures in accordance with alternative embodiments of the invention.

In yet another application, the micro-switch 1 can be adapted for use in a silicon micro-machined pitot tube. FIG. 17 is a cross sectional diagram of a pitot tube 1500 in accordance with one embodiment of the invention. In this embodiment, the upper structural member 201 is extended, and a trough 1501 is formed in the upper surface of the extended portion of the upper structural member 201. An upper layer 1511 of structural material, such as monocrystalline silicon, is affixed over the upper structural member 201. An opening 1512 extends through cover layer 1511. The opening 1512 and trough 1501 expose the upper surface of the conductive membrane 216 to the outer atmosphere.

Similarly, the lower structural member 101 is extended, and a trough 1502 is formed on the lower surface of the extended portion of the lower structural member 101. This trough 1502 extends to the outer perimeter of the lower structural member 101 at point 1520, and also extends to join with the holes 105 at the lower surface of the lower structural member 101. A lower structural layer 1515 is affixed to the lower surface of the lower structural member 101. As a result, the lower surface of the conductive membrane 216 is exposed to the outer atmosphere through trough 1502 and holes 105.

The resulting structure can be used to measure air velocity as in a conventional pitot tube. Assuming that the incoming air flow, F, has a velocity $V_1$ and a pressure $P_1$, then at any other point in the flow we have $$P_2 + \tfrac{1}{2}\rho V_2^2 = P_1 + \tfrac{1}{2}\rho V_1^2$$

where ρ is the mass density of air. Since the opening 1520 is pointing towards the flow, and the corresponding trough 1502 extends all the way to the cavity 105 where the flow velocity $V_2$ is zero, the pressure at the bottom surface of the conductive member 216 must be $$P_2 = P_1 + \tfrac{1}{2}\, \rho V_1^2$$

On the other hand, the opening 1512 is pointing a direction perpendicular to the flow, so through the trough 1501, the pressure at the top surface of the conductive membrane is simply $P_1$, then the differential pressure on the switch is $$\Delta P = P_2 - P_1 = \tfrac{1}{2}\, \rho V_1^2$$

In addition to acting as a switch, our device can also be used as an analog sensor, since the movement of the membrane which is caused by the velocity, will cause a change in the capacitance between the contact pads.

Figure 18:
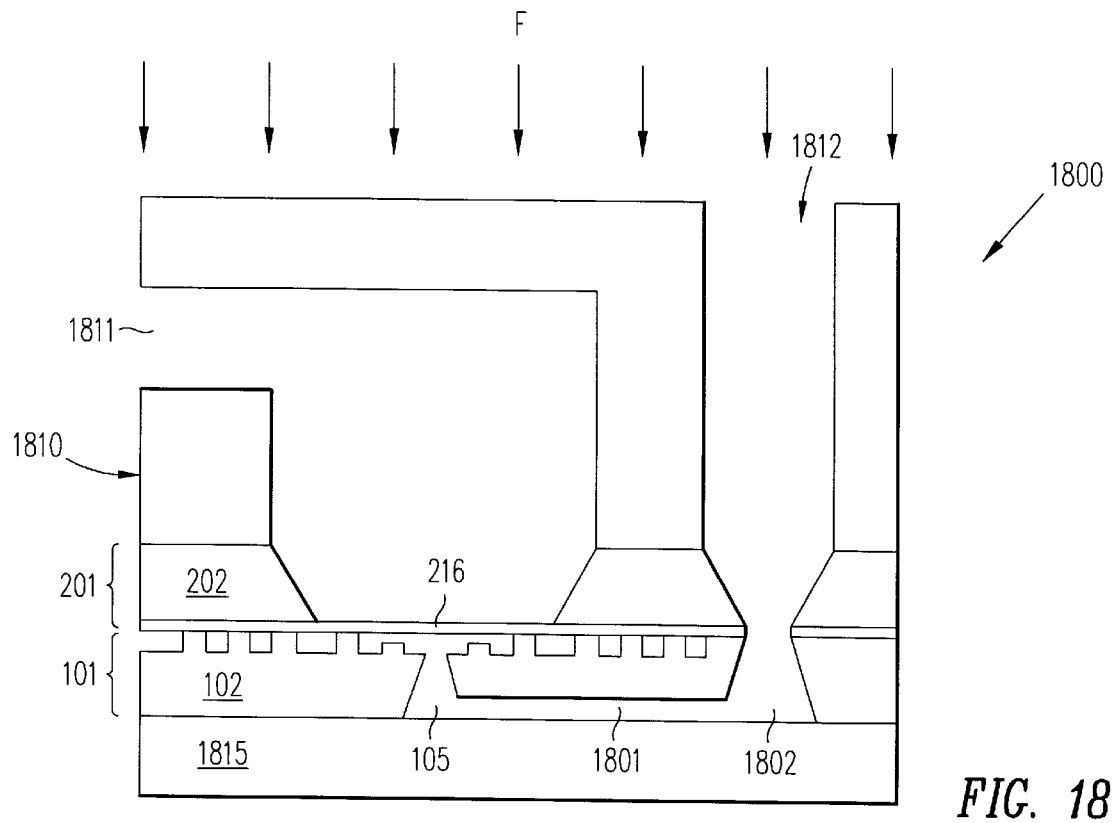

Other pitot tube structures can also be implemented using the structures of micro-switches 1 and 1A. For example, FIG. 18 illustrates a three layer pitot tube structure 1800 which includes a lower structural member 101 having a trough 1801 formed on its lower surface, and an opening 1802 which extends through the lower structural member to the trough 1801. A lower layer 1815 of structural material is bonded to the lower surface of the lower structural member 101. As a result, trough 1801 and an opening 1802 expose holes 105 at the underside of the lower structural member 101. An opening 1803 extends through the upper structural member 201, such that opening 1803 is aligned with opening 1802. Housing 1810 is attached to the upper surface of the upper structural member 201. Housing 1810 includes openings 1811 and 1812 which expose the conductive membrane 216 to the external air flow F. Pitot tube structure 1800 operates in the same manner previously described for pitot tube structure 1500.

Figure 19:
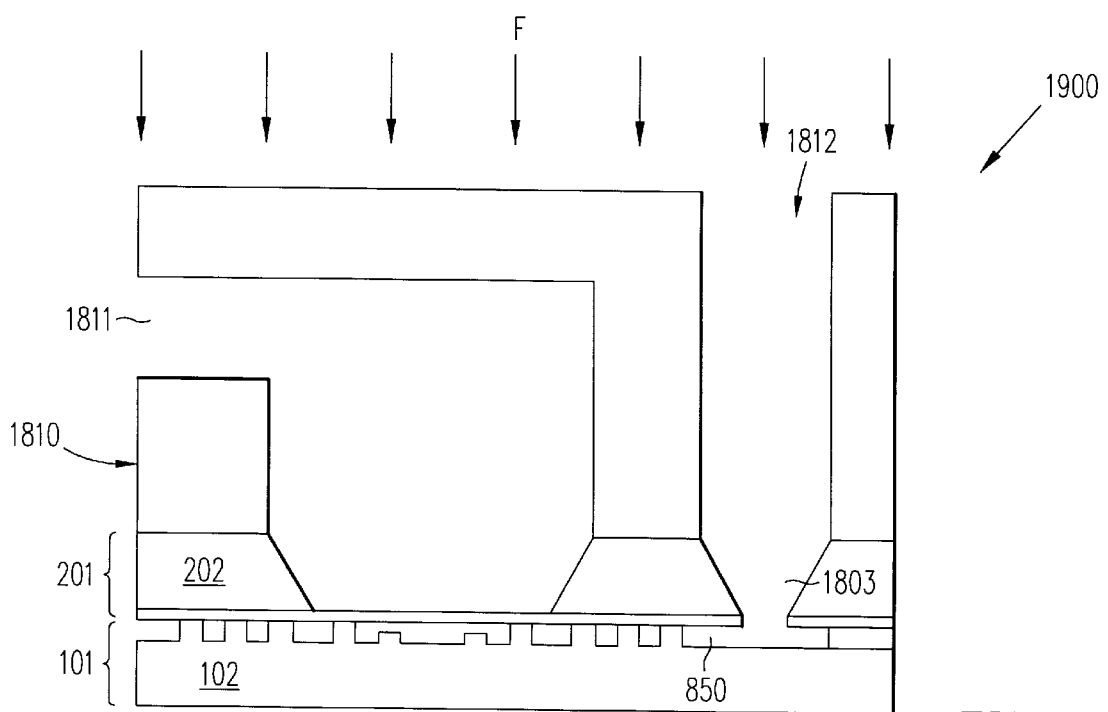

Similarly, FIG. 19 illustrates a two layer pitot tube structure 1900. Similar elements in pitot tube structures 1800 and 1900 are labeled with similar reference numbers. Pitot tube structure 1900 exposes the underside of conductive membrane 216 to opening 1803 through a trench 850 formed in the upper surface of the lower structural member 101. Trench 850 was previously described in connection with FIG. 9. Pitot tube structure 1900 operates in the same manner as pitot tube structures 1500 and 1800. In another embodiment, a pitot tube structure can be made of another material (such as plastic) and bonded to the switch (which is made from silicon).

Chemical Detector

Figure 20:
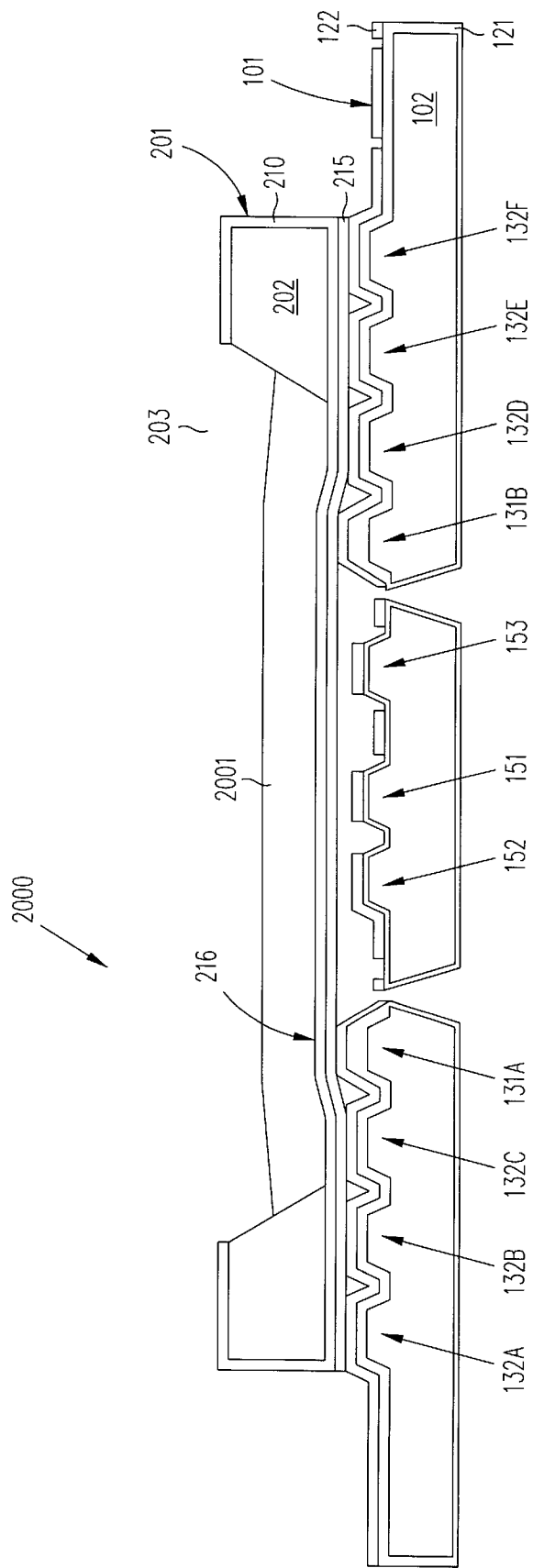
FIG. 20 is a cross sectional view of a micro-switch modified to operate as a chemical detector in accordance with another embodiment of the invention.

FIG. 20 illustrates a micro-switch 1 which is adapted for use as a gas or chemical detector 2000 (for example, carbon monoxide). In this embodiment of the invention, a chemical absorbent material 2001, is deposited over the conductive membrane 216 within opening 203. Material 2001 absorbs chemical present in the ambient atmosphere. Upon absorption, the material 2001 expands, thereby forcing the conductive membrane 216 to deform into contact with the contact pads 151–153. The resulting closed circuit can be used to identify the presence of an excessive amount of a toxic chemical in the ambient atmosphere.

Although the invention has been described in connection with several embodiments, it is understood that this invention is not limited to the embodiments disclosed, but is capable of various modifications which would be apparent to a person skilled in the art. For example, in other variations, other numbers of contact pads are used. Moreover, although the bonding pads 161–164 have been described as existing on the upper surface 102A of the lower structural member 101, it is understood that these bonding pads can alternatively be located on the lower surface 102B of the lower structural member 101. In such an embodiment, the bond pads 161–164 are connected to their corresponding contact pads 151–153 by conductive vias which extend through the substrate 102 of the lower structural member 101.

In addition, instead of two structural members, one containing the conductive membrane and one containing the contact pads, the micro-switch can be fabricated on a single substrate. A sacrificial material (e.g., silicon oxide) with a thickness equal to the desired gap between the membrane and the contact pads can be deposited on the top surface of the lower structural member to form a temporary spacer. The flexible membrane can then be deposited and the spacer material can be removed to form the micro-switch. Thus, the invention is limited only by the following claims.

What is claimed is:

1. A micro-switch comprising:
   a first structural member having one or more spacer pads formed thereon; and
   a second structural member having a membrane, the first structural member being joined with the second structural member such that the membrane contacts the spacer pads, with the spacer pads introducing deformation into the membrane.

2. The micro-switch of claim 1, further comprising a plurality of support pads formed on the first structural member, wherein the membrane is connected to the support pads.

3. The micro-switch of claim 2, wherein the spacer pads are higher than the support pads.

4. The micro-switch of claim 1, wherein the membrane is silicon nitride.

5. The micro-switch of claim 1, further comprising a conductive film formed on the membrane.

6. The micro-switch of claim 5, wherein the conductive film comprises gold.

7. The micro-switch of claim 5, wherein the conductive film comprises permalloy.

8. The micro-switch of claim 1, wherein the spacer pads are arranged to define a closed pattern, the micro-switch further comprising a first contact pad located on the first structural member within the closed pattern.

9. The micro-switch of claim 8, wherein the spacer pads are higher than the first contact pad.

10. The micro-switch of claim 8, wherein the first contact pad is higher than the spacer pads.

11. The micro-switch of claim 8, further comprising a second contact pad located on the first structural member within the closed pattern.

12. The micro-switch of claim 1, further comprising one or more holes which extend through the first structural member to expose the membrane through the first structural member.

13. The micro-switch of claim 12, further comprising a housing having a cavity, wherein the first structural member is affixed over the cavity to form a sealed chamber, wherein the membrane is exposed to the sealed chamber through the one or more holes.

14. The micro-switch of claim 1, further comprising one or more channels located in the upper surface of the first structural member to expose the membrane via the first structural member.

15. The micro-switch of claim 1, further comprising:
   a housing having a first cavity and a second cavity, wherein the micro-switch is mounted in the housing such that a first surface of the membrane is exposed to the first cavity and a second surface of the membrane is exposed to the second cavity;

a first air flow channel coupled to the first cavity, wherein the first air flow channel has a first opening which is exposed to receive an ambient air flow; and a second air flow channel coupled to the second cavity, wherein the second air flow channel has an second opening which is exposed to receive an ambient air flow, the second opening being located out of phase with the first opening.

16. The micro-switch of claim 15, wherein the first air flow channel and the second air flow channel are located in a single tube.

17. The micro-switch of claim 15, wherein the first air flow channel is located in a first tube, and the second air flow channel is located in a second tube.

18. The micro-switch of claim 15, wherein the second opening is located at least 90 degrees out of phase with the first opening.

19. A system comprising:

a fan for creating an air flow;

a micro-switch located in a position to receive the air flow, wherein the micro-switch comprises a membrane which is deflected in the presence of the air flow.

20. The system of claim 19, wherein the micro-switch further comprises a first structural member having one or more spacer pads formed thereon, wherein the membrane is joined to the first structural member such that the spacer pads cause the membrane to deform.

21. The system of claim 20, wherein the micro-switch further comprises one or more holes which extend through the first structural member to expose the membrane through the first structural member.

22. The system of claim 20, wherein the membrane has a first side and a second side, the micro-switch further comprising:

means for applying a positive pressure to the first side of the membrane in response to the air flow; and means for applying a negative pressure to the second side of the membrane in response to the air flow.

23. The system of claim 19, further comprising a control system coupled to the micro-switch, wherein the control system determines the operating characteristics of the fan in response to the deflection of the membrane of the micro-switch.

24. The system of claim 23, wherein the control system is further coupled to the fan to control the rotational speed of the fan.

25. The system of claim 23, further comprising one or more additional fans coupled to the control system, wherein the control system controls the number of operational fans to achieve a desired air flow.

* * * * *